H. C. PETERS.
ADDING MACHINE.
APPLICATION FILED NOV. 28, 1916.

1,386,021. Patented Aug. 2, 1921.
10 SHEETS—SHEET 1.

Inventor

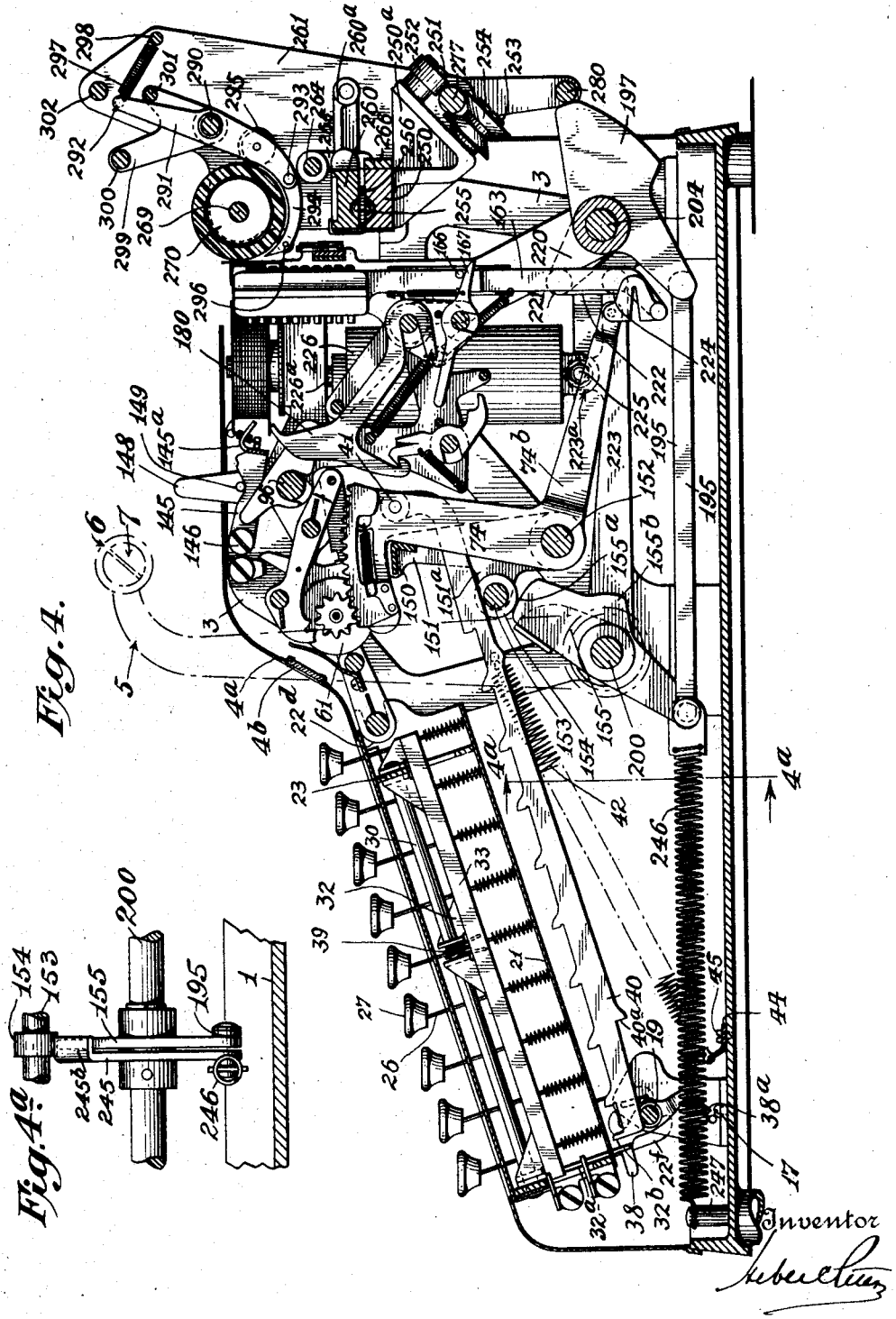

H. C. PETERS.
ADDING MACHINE.
APPLICATION FILED NOV. 28, 1916.
1,386,021.
Patented Aug. 2, 1921.
10 SHEETS—SHEET 5.
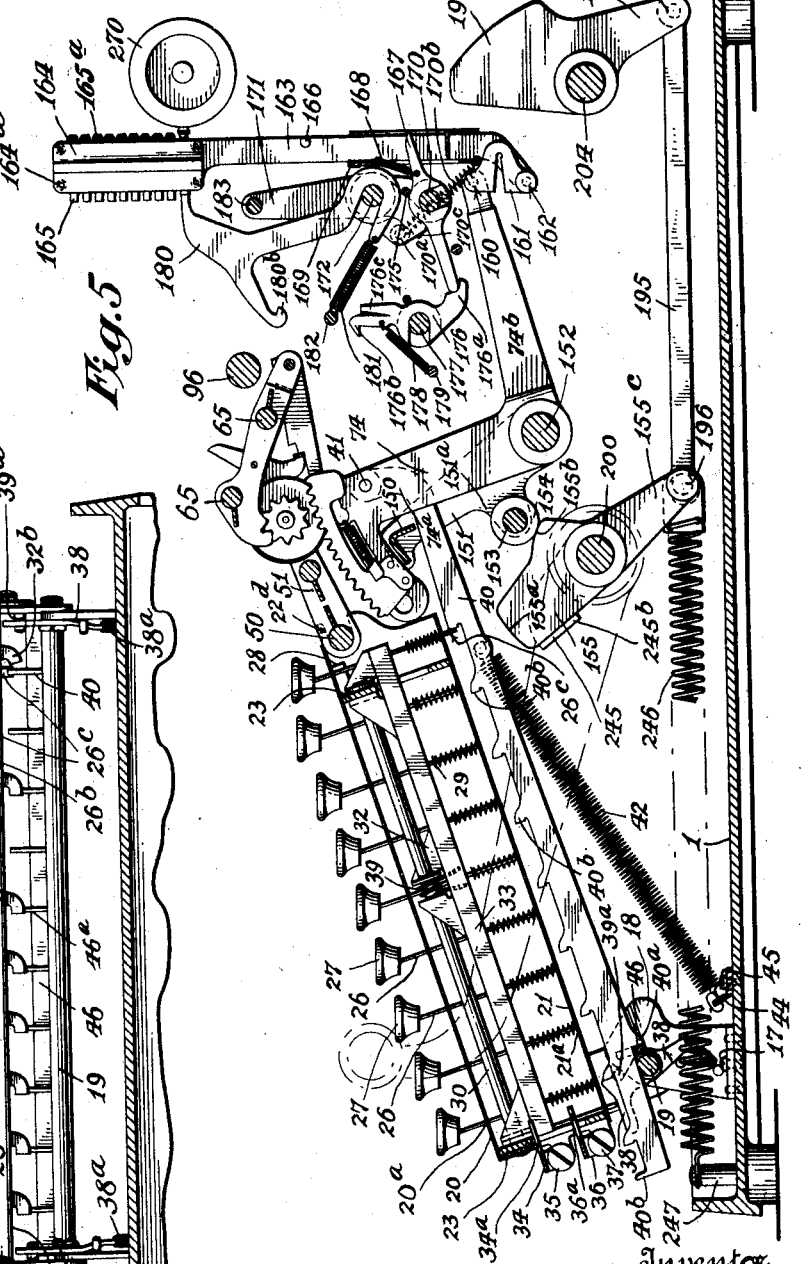
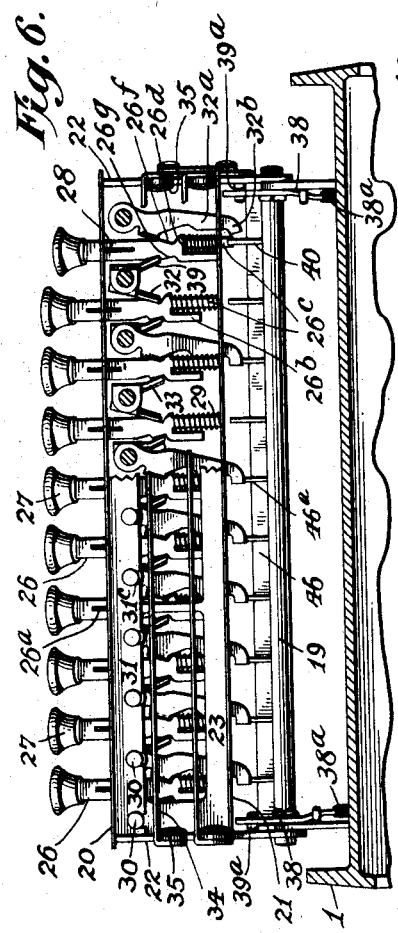

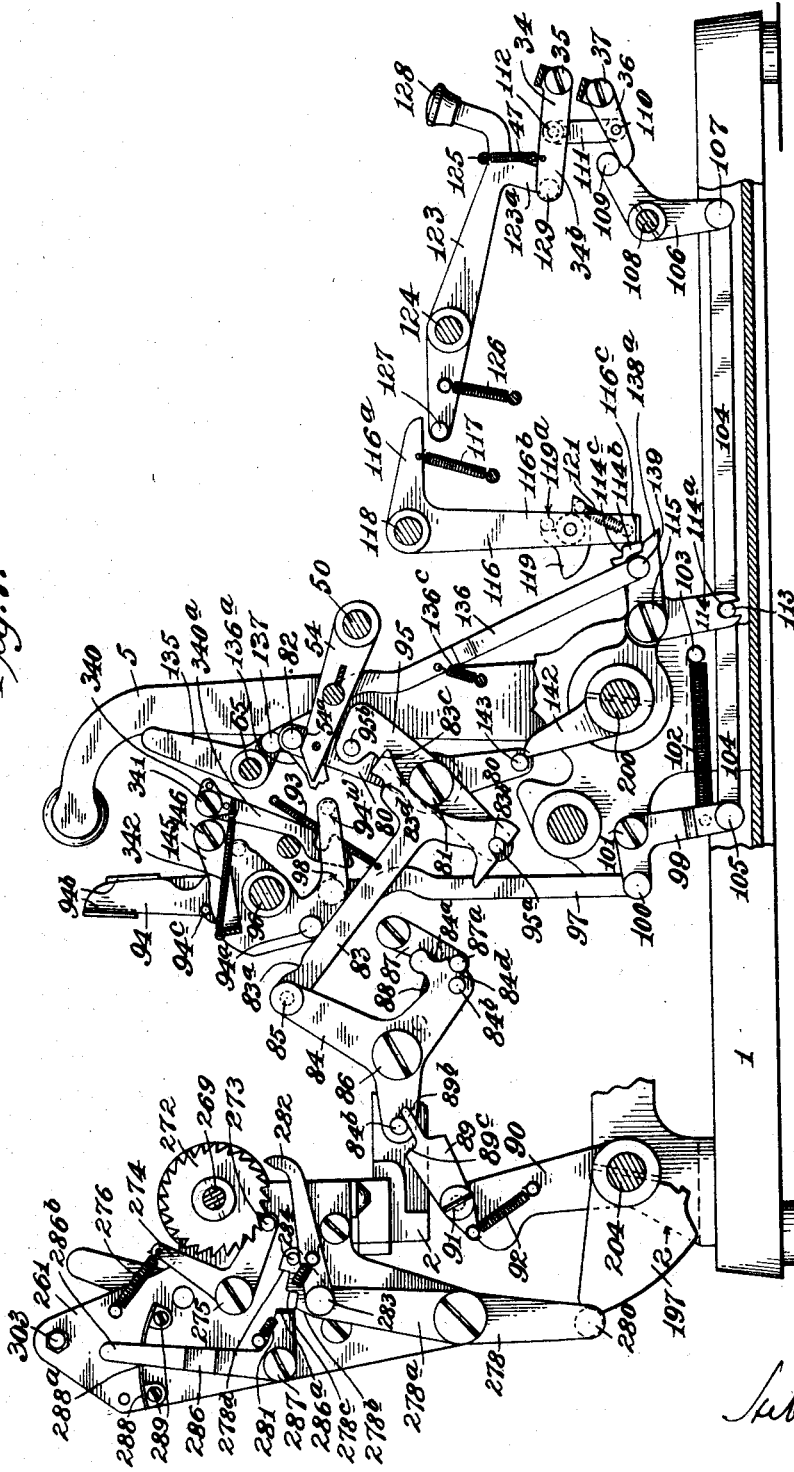

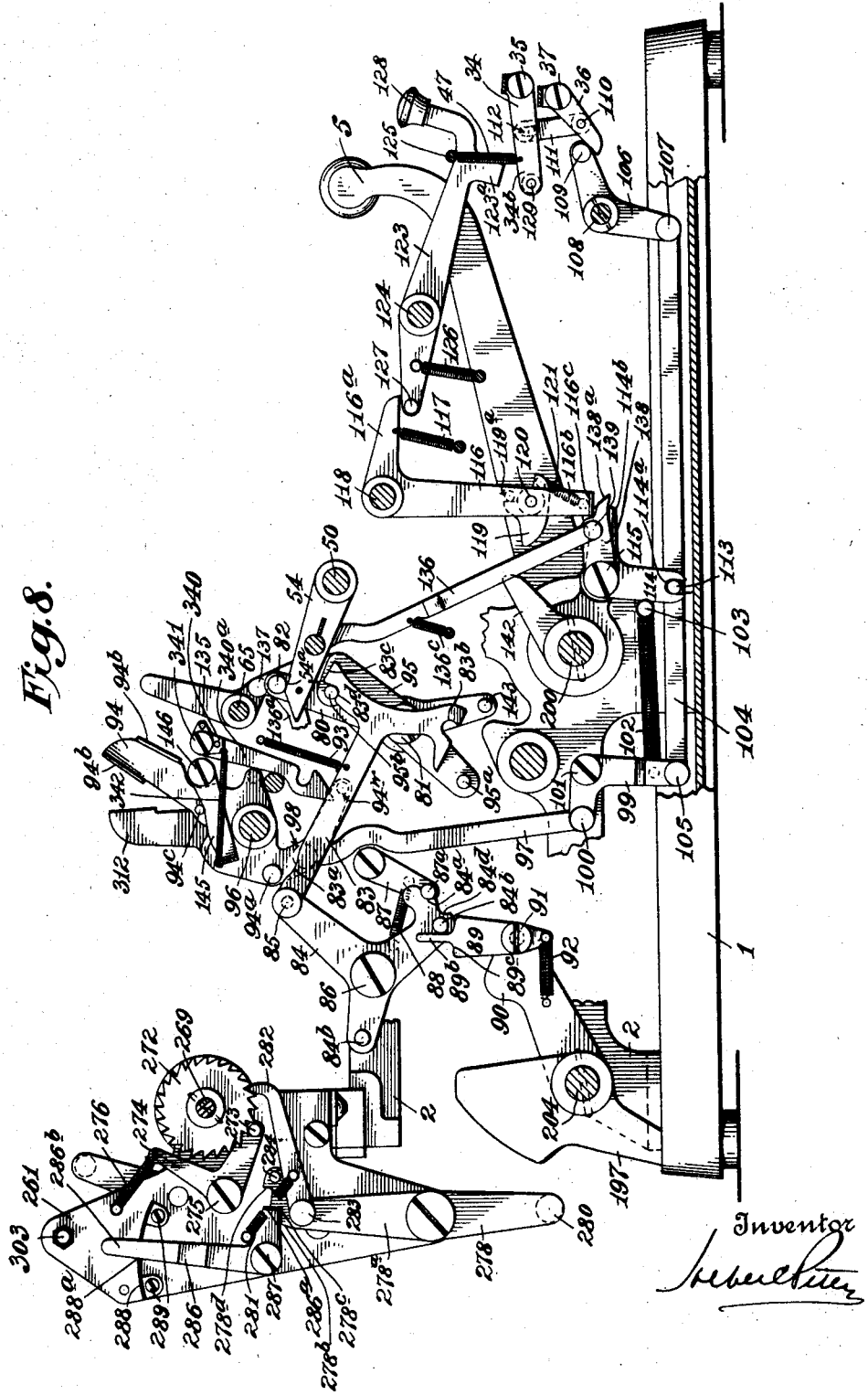

H. C. PETERS.
ADDING MACHINE.
APPLICATION FILED NOV. 28, 1916.

1,386,021.

Patented Aug. 2, 1921.
10 SHEETS—SHEET 8.

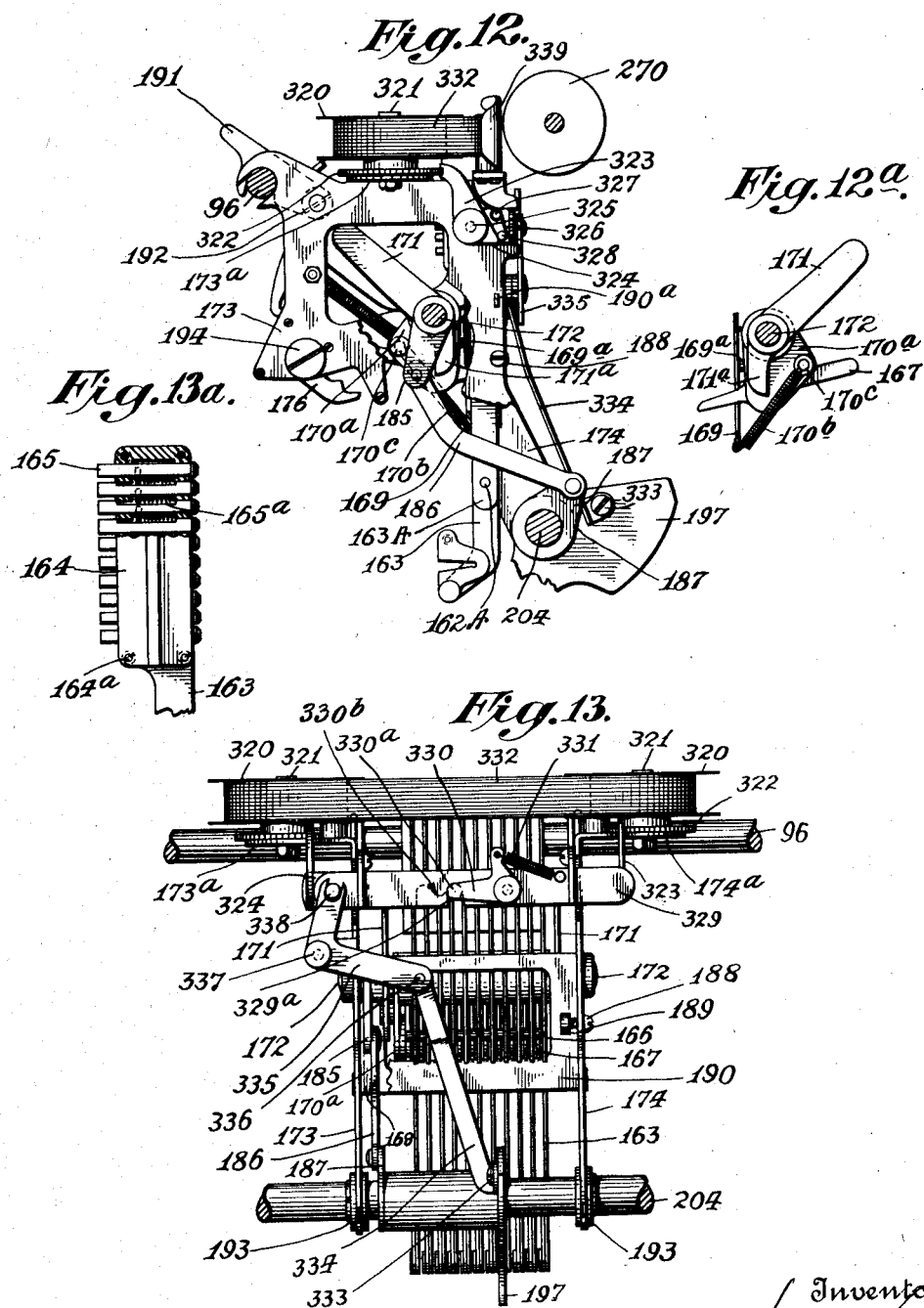

H. C. PETERS.
ADDING MACHINE.
APPLICATION FILED NOV. 28, 1916.

1,386,021.

Patented Aug. 2, 1921.

Inventor

UNITED STATES PATENT OFFICE.

HEBER C. PETERS, OF NEW YORK, N. Y., ASSIGNOR TO PETERS-MORSE MANUFACTURING CORPORATION, A CORPORATION OF NEW YORK.

ADDING-MACHINE.

1,386,021.  Specification of Letters Patent.  Patented Aug. 2, 1921.

Application filed November 28, 1916. Serial No. 133,846.

*To all whom it may concern:*

Be it known that I, HEBER C. PETERS, residing at New York city, in the county of New York, State of New York, have invented certain new and useful Improvements in Adding-Machines, of which the following is a specification.

This invention is an adding machine characterized chiefly by a compact construction and simplification of mechanism, said machine being more readily portable by reason of its reduction in weight and dimensions. Also certain of the manually operated devices are so positioned with respect to the main operating lever that they are more readily accessible and can be manipulated with greater facility, than in prior machines capable of performing the same functions, of which I have knowledge.

A salient feature of the invention resides in such an organization of the key-board, the accumulating section and the printing mechanism that the indications afforded by these several devices and each of them are at all times in the full and unobstructed view of the machine operator, being visible at a glance; and to these ends I arrange the accumulating section rearwardly of and above the key board, and position the printing mechanism in such relation to the accumulating section, that the printing line is above and to the rear of the plane of said accumulating section.

Compactness and simplicity of construction are obtained in this invention by: first, arranging substantially all the operating and controlling means for the various mechanisms upon one side portion only of the machine, and, second, to the manner of mounting a cam which controls the operation of the type carrying members to the end that said cam operates independently of the shaft upon which it is carried in the following particulars:—as said shaft turns in one direction the cam is not controlled by the turning movement of said shaft, but when the shaft turns in the opposite direction, the cam is actuated simultaneously therewith.

I have also simplified the construction, reduced the number of parts and designed the machine so that the problems and cost of manufacturing are materially decreased. This has been done without limiting the machine in capacity, protective features, or necessary equipment such as are required in commercial work.

In the drawings which form part of this specification and illustrate a preferred form of embodiment of invention, Figure 1 illustrates a plan view of the machine with casing omitted and handle removed.

Fig. 4 illustrates a right side elevation shown partly in section taken on the line 4—4 Fig. 1, with the parts in normal position.

Fig. 4$^A$ shows a detailed view of the main operating cam and its associated parts.

Fig. 5 is a side elevation showing the position assumed by some of the parts illustrated in Fig. 4 when the 9 key has been depressed and the handle moved to its forward position.

Fig. 6 is an end elevation of the key-board shown partly in section.

Figure 1:
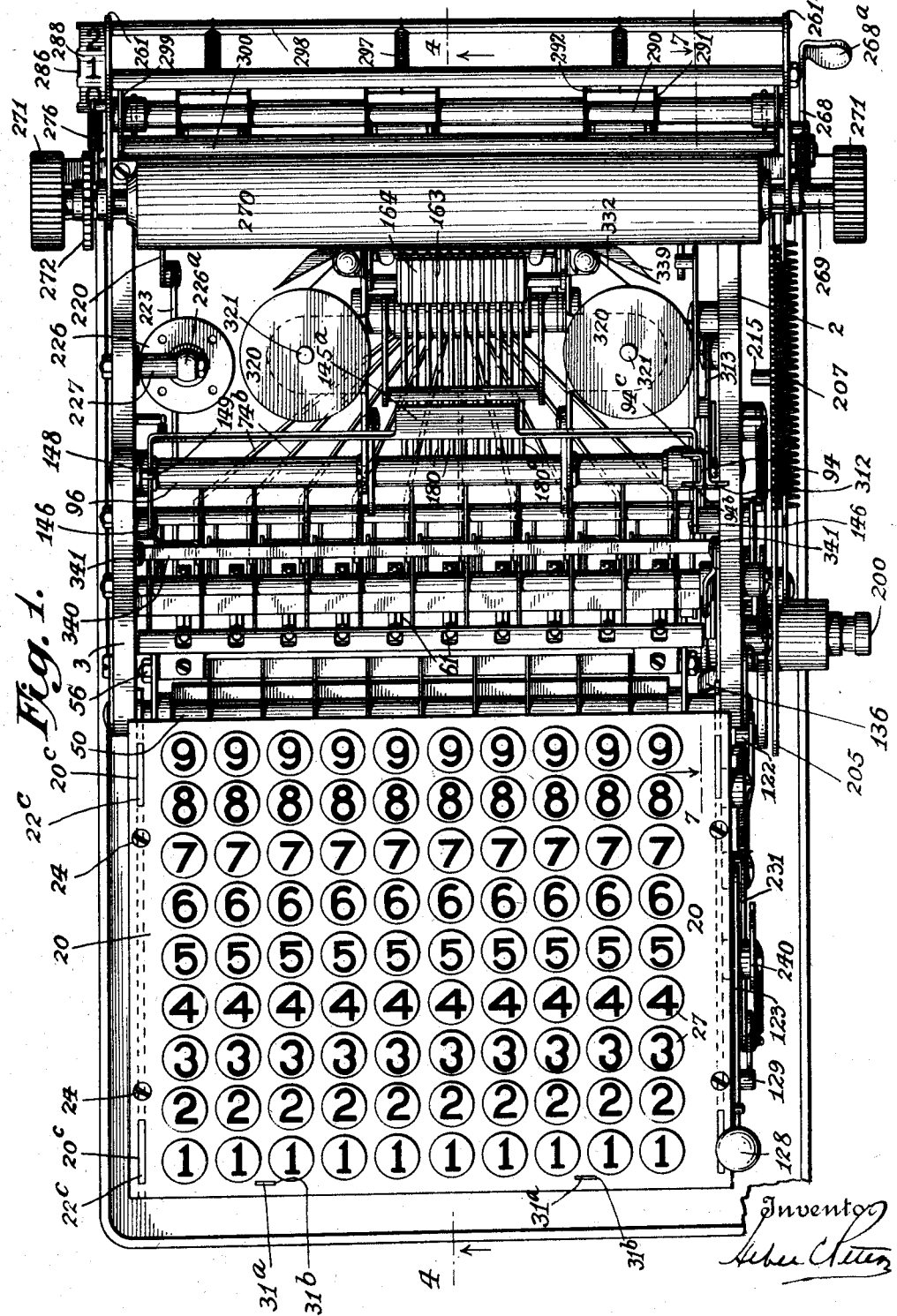

Fig. 7 is a left side elevation, partly in section, taken on line 7—7 Fig. 1, said figure illustrating such of the mechanism as has to do particularly with the control and operation of the accumulating section, the parts being shown in their normal position; said figure illustrating, also, a left side elevation of the carriage.

Fig. 8 shows the position assumed by the parts illustrated in Fig. 7 when the total lever and the operating handle have been moved to their extreme forward position.

Figure 9:
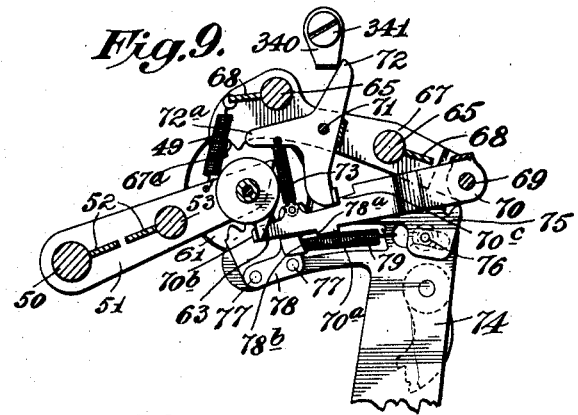
Figure 11:
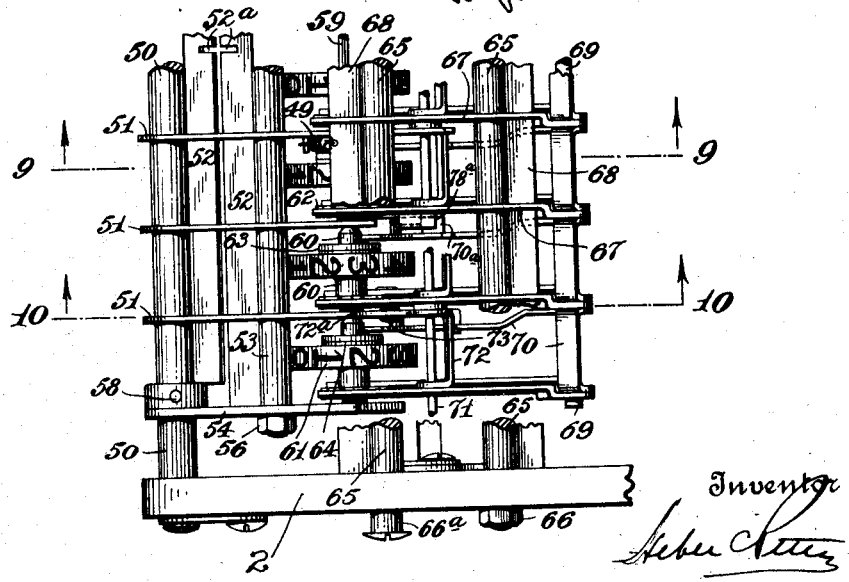

Fig. 9 is an enlarged right side elevation, partly in section, showing certain parts of the accumulating section taken on the line 9—9 Fig. 11.

Figure 10:
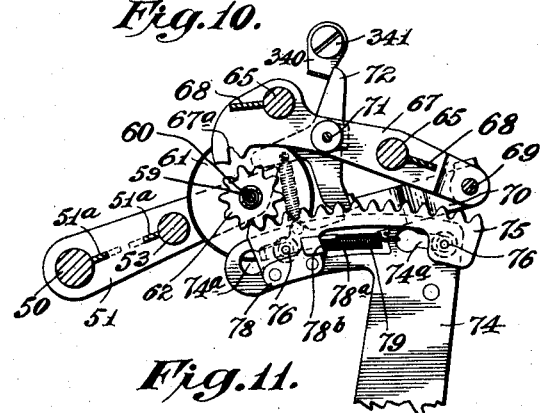

Fig. 10 illustrates a right side elevation, partly in section, of certain parts of the accumulating section taken along the line 10—10 Fig. 11.

Fig. 11 is an enlarged plan view of the accumulating section with portions broken away.

Fig. 12 is a right side elevation of the printing section with a portion of the side plate broken away.

Fig. 12<sup>A</sup> is a detailed left side elevation of certain of the parts shown in Fig. 12.

Fig. 13 is a rear elevation of the printing section.

Fig. 13<sup>A</sup> is an enlarged view of the upper end of each type bar, shown partly in section.

Figure 14:
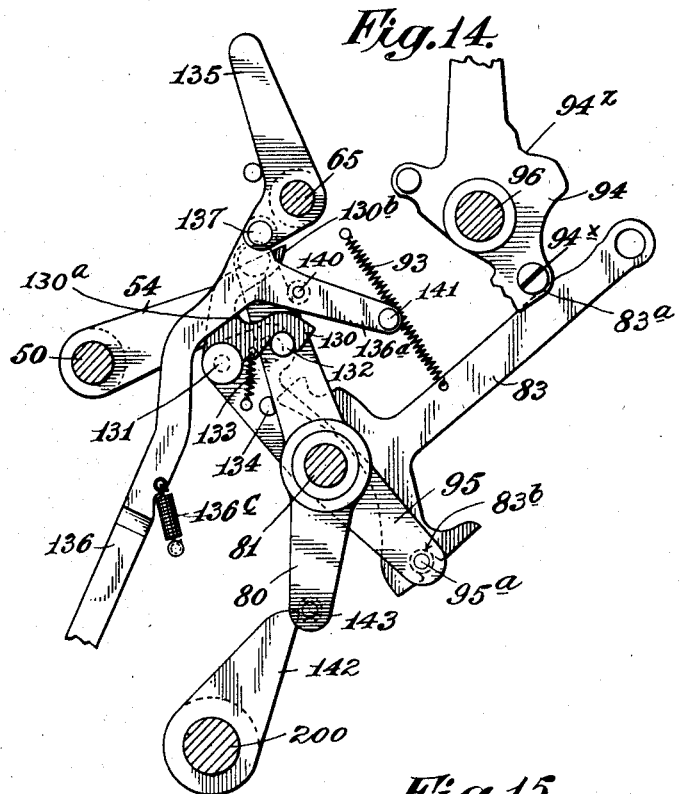

Fig. 14 shows certain of the parts of the machine enlarged which have particularly to do with the control of the non-add mechanism.

Figure 15:
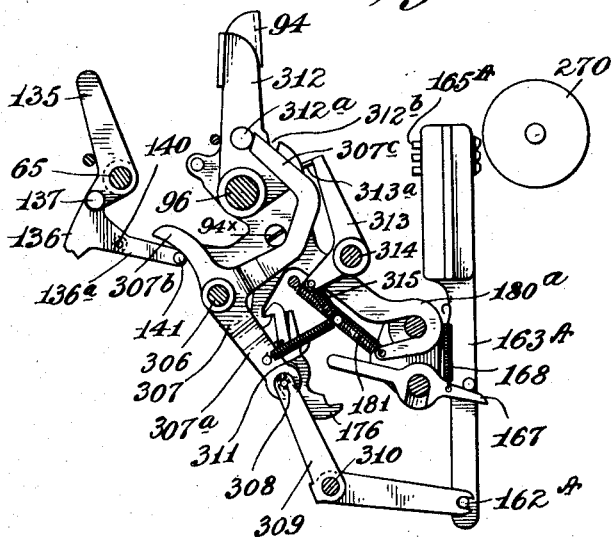

Fig. 15 is a right side elevation of the parts in the machine which have to do particularly with the operation and printing of the special designating signs.

Figure 3:
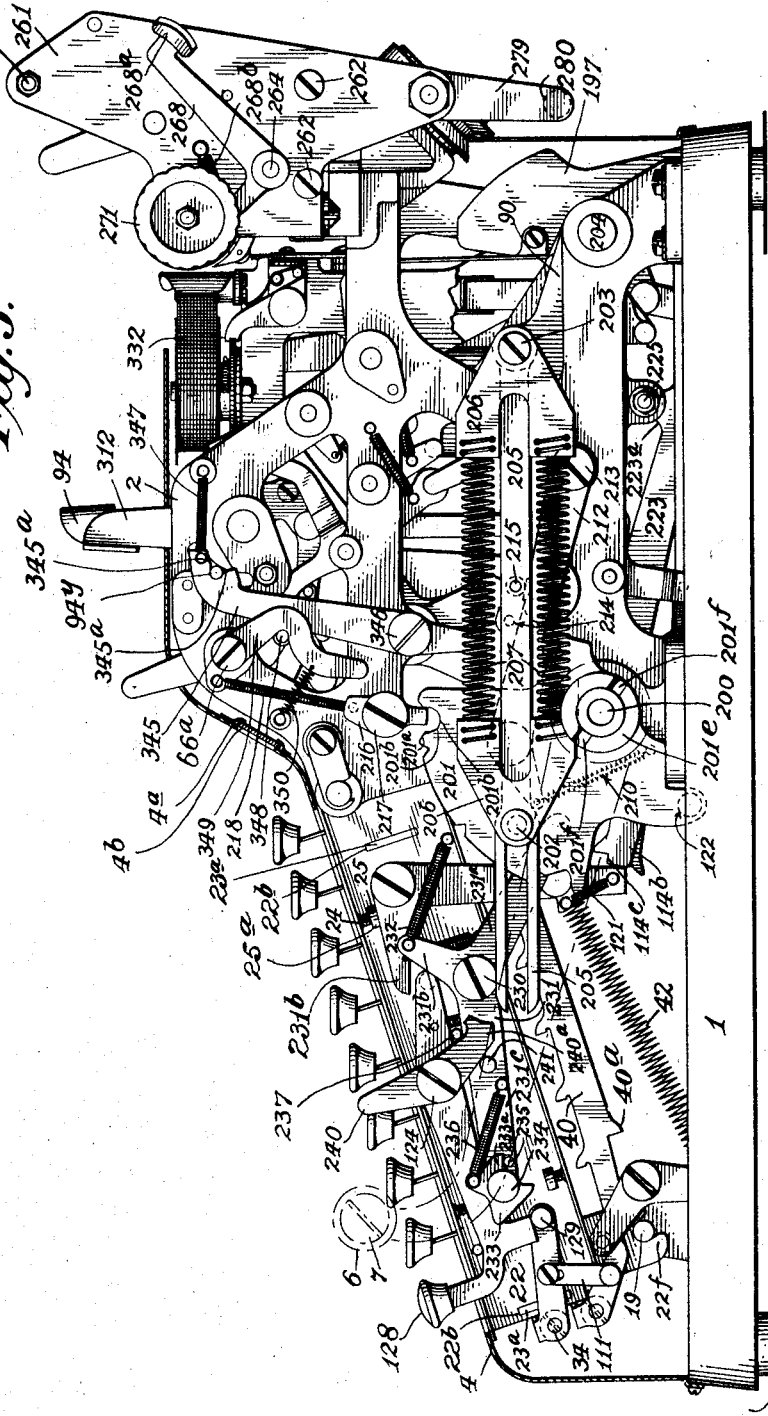
Fig. 3 illustrates a right side elevation showing the position assumed by some of the parts when the handle is moved to its forward position.

On the base 1 are mounted side frames 2 and 3 (Figs. 1 and 3) supporting the majority of the parts of the machine.

4 (Fig. 2) is a casing covering the working parts of the machine. Said casing has an opening 4<sup>a</sup> covered by a glass plate 4<sup>b</sup>, said opening affording an unobstructed view of the number wheels, 61, (see Fig. 4). An operating lever or handle 5, preferably detachable, is mounted on shaft 200 (sometimes called herein the handle or main shaft) at the right hand side of the machine. Handle 5 is equipped with a hand piece 6 loosely mounted on stud 7.

The key-board (see Figs. 5 and 6) has a top plate 20 and a bottom plate 21 in contact with side plates 22 and end plates 23. Ears 23<sup>a</sup> of end plates 23 (see Figs. 2 and 3) project into slots 22<sup>b</sup> of side plates 22. Top plate 20 has slots 20<sup>c</sup> into which ears 22<sup>c</sup> of side plates 22 project, thus bringing these several parts into accurate relation and facilitating the assembling thereof. These plates when set together are held rigidly in place by screws 24 and nuts 25, said nuts being inserted into the T slots 25<sup>a</sup> in the side plates 22 and clamping top plate 20 and bottom plate 21 against the side plates 22 and end plates 23, forming a rigid box-like structure. Top plate 20, and bottom plate 21 are suitably slotted at 20<sup>a</sup> and 21<sup>a</sup> respectively, providing slots for supporting and guiding the depressible keys 26, said keys being arranged to slide in said slots substantially at right angles to the top and bottom plates. Keys 26 are arranged in a series of ten rows, nine keys in each row, one row for each denomination. Each key 26 is provided at its upper end with a finger piece 27, herein referred to as the key top. The key top is set at an angle with the key stem such as brings the top surface of the key top substantially parallel to the base of the machine. These tops are numbered from 1 to 9 as shown in Fig. 1. Each key has a slot 26<sup>a</sup> through which runs a strip 28 one for each row of keys, said strip serving to limit the upward movement of the keys 26. The strips 28 are fixedly supported in end plates 23. The lower end of key 26 is forked forming legs 26<sup>b</sup> and 26<sup>c</sup>. When key 26 is depressed, leg 26<sup>b</sup> contacts with bottom plate 21, limiting the downward movement of key 26. Co-incidently leg 26<sup>c</sup> is projected beyond bottom plate 21 and acts as a stop for stop bar 40 (see Fig. 5). Key 26 is depressed against pressure of spring 29, surrounding leg 26<sup>c</sup>, one end of said spring abutting shoulder 26<sup>d</sup> of key 26 and the other end resting on bottom plate 21.

Spring 29 acts to hold key 26 in its upward or normal position, and to restore it to said position when released after having been depressed. End plates 23 are perforated to afford a support for rods 30, said rods running parallel to each other and to the rows of keys. Lateral movement of these rods 30 is prevented by locking strip 31, said strip being held in place by ears 31<sup>a</sup> projecting into slots 31<sup>b</sup> in top plate 20 (see Fig. 1). Recesses 31<sup>c</sup> of strip 31 engage grooves in rods 30, holding said rods in fixed position. Mounted on rods 30 are strips 32 and 33 pressed in opposite directions by spring 39, said spring surrounding rod 30 as shown in Fig. 5, its projecting ends pressing against strips 32 and 33 so that said strips are held against edges of keys 26. On one edge of each key 26 is a cam surface 26<sup>f</sup> and on the opposite edge a cam surface 26<sup>g</sup>, (see Fig. 6). Since strip 33 is spring pressed against key 26, when key 26 is depressed said strip 33 will ride along the cam surface 26<sup>g</sup> (see Fig. 6) and will latch key 26 in its depressed position when key 26 is fully depressed. Key 26 is released by swinging latch strip 33 away from key 26. To do this, there is provided a comb 34 pivoting on studs 35 mounted in side plates 22. This comb 34 has a series of fingers 34<sup>a</sup>, one for each latch strip 33. Each finger 34<sup>a</sup> is arranged to contact with the forward end of latch strip 33 when the fingers 34<sup>a</sup> are swung downward. This moves latch strips 33 away from keys 26 releasing any depressed keys.

The strip 32, spring pressed against cam surface 26<sup>f</sup>, will ride along cam surface 26<sup>f</sup> when keys 26 are depressed, and will swing to the right its depending arm 32<sup>a</sup> located at its forward end. Said arm has a stop portion 32<sup>b</sup> which normally lies in the path of stop bar 40, arresting the forward movement of said stop bar 40 at the zero position. Removing the stop portion 32<sup>b</sup> from the path of stop bar 40, permits said stop bar, when the machine is operated, to pass forward beyond stop portion 32$^b$. Comb 36 pivoting on studs 37, mounted in side plate 22, has a series of fingers 36$^a$ one for each stop-bar release strip 32. Each finger 36$^a$ is arranged to contact with the forward end of strip 32 when fingers 36$^a$ are swung downward. This moves said stop-bar release strip 32 to the right, and with it the stop portion 32$^b$ out of the path of stop bar 40 when it is desired to do so with no number keys depressed, as in the operation of printing a total. The end plates 23 have proper openings to allow free passage of fingers of combs 34 and 36, and for the extension of strips 32 and 33 rearwardly.

Side plates 22 are forked at 22$^d$ and 22$^f$, (see Figs. 4 and 5). Forks 22$^d$ fit over shaft 50, providing a rear support for the key-board. Forks 22$^f$ fit over rod 19, providing a forward support for the key-board, said rod 19 being supported in brackets 18 fastened to base 1 by screw 17. Latches 38 mounted on rod 19 are under tension of spring 38$^a$, one end of which is fastened to latch 38 and the other to bracket 18. Said latches lock over studs 39$^a$ fixed in side plates 22, holding the key-board in place. The key-board may be removed by depressing the latches 38, thus releasing studs 39$^a$ and then lifting the forward end of key-board upward. It is noted that the key-board is removable and replaceable with ease and facility, and that all the parts carried by said key-board are removable therewith, said key-board when in position being retained in fixed relation to the other parts of the machine.

All the stops bars 40 are loosely supported at the rear end by studs 41, fixed in diverging levers 74, mounted on shaft 152. Stop bars 40 are held in their rearward position by the L shaped cross bar. 150 against the tension of springs 42, one end of said spring being fast to bar 40, the other end being fast to spring strip 44 screwed to base 1 by screws 45. A separator strip 46 with suitable slots 46$^a$ acts as a forward support and a side guide for stop bars 40. A stop portion 40$^a$ of stop bar 40 contacts with strip 46 to limit the extreme forward movement of stop bar 40. Stop portions 40$^b$ all located in one vertical plane will, on operating the machine, co-act with their respective key stops 26$^c$ (see Fig. 5) allowing stop bars 40 to advance a distance proportional to the value of the key depressed, or else contact with the stop portion 32$^b$ if no key is depressed, said contact with 32$^b$ representing the zero printing position of the type bar 163. It should be noted that as the diverging levers 74 move forward, the stop bars 40 have a double movement, i. e., a forward and an upward movement due to the pivoting point 41 being to the rear of center of shaft 152 on which diverging levers 74 swing. This double movement enables any stop portion 40$^b$ to clear and avoid contact with other than its proper key stop 26$^c$ despite the fact that all the key stops 26$^c$ and all the stop portions 40$^b$ lie in the same vertical plane.

Mounted on shaft 50 are partition plates 51, spaced apart by separator strips 52. Through plates 51 runs rod 53 threaded at each end. The separator strips 52 are slotted at 52$^a$, said slot straddling the plates 51, the solid portion of the strip entering the key slot 51$^a$ of the plate 51, the whole being locked in place by forcing the shaft 50 and the rod 53 through their respective holes in plate 51. The threaded ends of rod 53 pass through end plates 54 and 55, the whole being clamped together by nuts 56 on rod 53, forming the number wheel frame. End plates 54 and 55 are pinned to shaft 50 by pins 58. Partition plates 51 and end plates 54 and 55 are perforated at their rearward end, providing a support for rod 59 on which the number wheel units are loosely mounted. The number wheel units consist of a bushing 60 on which is mounted a numbered dial 61, a gear 62, a cam 63 and a spacing washer 64, (see Fig. 11) separating dial 61 and cam 63, all pinned together to form a single unit.

Mounted in the side frames 2 and 3 are rods 65, (see Figs. 9, 10 and 11) threaded at each end and clamped in position by nuts 66 and sleeve nut 66$^a$. Supported on rods 65 are partition plates 67 spaced apart by separator strips 68. The rearward ends of partition plates 67 are perforated to support rod 69 on which are loosely mounted levers 70, ten in number. Partition plates 67 are also perforated between rods 65 to support rod 71 on which are loosely mounted the three armed levers 72, ten in number. A spring 73 connects the lever 70 and its associated lever 72 holding them in contact with each other, (see Fig. 9). The forward ends of plates 67 are recessed at 67$^a$ forming detents for gears 62 when said gears are in the upper position and out of mesh with segmental racks 75.

Mounted on the upper ends of diverging levers 74 are segmental racks, 75. Shoulder studs 76 fixed in each rack 75 slide freely in slots 74$^a$ provided in diverging lever 74, allowing a sliding movement back and forth of the rack 75 with respect to the diverging lever 74.

Riveted to rack 75 by rivets 77 is a step piece 78. A spring 79 has its rear end connected to lever 74 and its forward end to rack 75, its tension acting to move the rack 75 always to the rearward. Lever 70 has an offset lip 70$^a$ which contacts with the face 78$^a$ of step piece 78 fixed to the rack 75 of next higher order. With the parts as shown in Fig. 9, this arrangement holds the rack 75 in a forward position against the tension of spring 79. If the lever 70 is depressed (which occurs when the cam surface 63 passes in a counter clockwise direction past the offset lip 70$^b$ of lever 70 striking said lip and depressing said lever) then the offset 70$^1$ will be removed from the path of the face 78$^a$, and under the tension of spring 79 the rack will move rearward until the face 78$^b$ contacts with 70$^a$, the movement so allowed being equal to the space of one tooth—or such as would rotate the number wheel one unit. This provides the familiar method for registering a unit on a wheel of higher order when the wheel of next lower order has completed a revolution. The depression of lever 70 will allow lever 72, acting under tension of spring 73, to change its position with relation to step 70$^c$ from the position shown in Fig. 9 to that shown in Fig. 10, thus holding the lever 70 in a depressed position. The upward movement of the number wheel frame, as presently described, will cause the rear end of partition plates 51 to contact with the arm 72$^a$ of the lever 72 and will restore the lever 72 to its normal position against the tension of spring 73. This upward movement of the number wheel frame takes place normally at the beginning of the next forward movement of the main operating lever at which time the diverging levers 74 move forward carrying with them the rack 75 and the step pieces 78 mounted thereon. Thus the lever 70 will be enabled to return to its upper or normal position.

The up and down movement of the number wheel frame is brought about by the backward and forward movement of the lever 80 (see Figs. 7 and 8) pivoting on stud 81, said lever carrying at its upper end cam roll 82 and said cam roll contacting with the cam surface 54$^a$ of the end plate 54 during its forward movement, forcing the number wheel frame downward against the tension of the spring 49, (see Figs. 9 and 10). The rearward movement of lever 80, carrying with it the cam roll, 82, allows the spring 49 to raise the number wheel frame to its upper position. In this way the gears are moved in and out of mesh with their associated racks 75.

The levers 80 and 95 (see Figs. 7, 8, 14 and 15) mounted loosely on stud 81 supported in side frame 2, work normally as a unit, said levers being locked together by the latch 130 (see Fig. 14) loosely mounted on the stud 131 fixed in the lever 95. Latch 130 hooks over pin 132 fixed in lever 80. Spring 133, one end of which is attached to latch 130 and the other end to lever 95 holds latch 130 normally in the position shown in Fig. 14. Pin 134, fixed in lever 95, abuts against the edge of lever 80, completing the lock. The arm 80 is swung back and forth by the movement of the pitman 83, one end of which is loosely connected to the three-armed lever 84 by the stud 85. Lever 84 swings on stud 86, and is held in its normal position by pin 87$^a$ mounted on swinging arm 87, said arm being held rearward by spring 88 (see Fig. 8). The pin 87$^a$ acts as a detent by resting in recesses 84$^a$ and 84$^d$ of the three armed lever 84 as the lever 84 is moved from one position to the other by the action of the double acting pawl 89, commonly called the wipe pawl, which is loosely mounted on the end of arm 90 by the stud 91, said wipe pawl having connected to its lower end a spring 92, the other end of said spring being connected to the arm 90. The wipe pawl 89 is normally held in the position shown in Fig. 7, the finger portion 89$^b$ being spring pressed against the pin 84$^b$, by the action of the spring 92, said pin 84$^b$ being fixed in lever 84 and projecting sufficiently to allow the finger portion 89$^b$ to pass by the stud 86 without interference. The forward movement of the arm 90 carries the wipe pawl with it until the shoulder 89$^c$ contacts with pin 84$^b$. The continued forward movement of the arm 90 and wipe pawl 89, forces the pin 84$^b$ upward, and the lever 84 will be rocked on its supporting stud 86 and the pin 87$^a$ will be forced out of its recess 84$^d$ and drop into the recess 84$^a$, detaining the arm 84 in position shown in Fig. 8. The continued forward movement of the arm 90 will bring the finger portion 89$^b$ of the wipe pawl 89 into contact with the pin 84$^b$, the parts being then as shown in Fig. 8. The return of the arm 90 to its rearward or normal position will swing the three armed lever 84 backward by the contact of the wipe pawl 89 with the pin 84$^b$, and by this means the pitman 83 is moved back and forth and with it the arm 80 and the cam roll 82, which cam in turn causes the number-wheel-frame to be moved up and down and the gears to be moved first out of mesh and then into mesh with the racks 75, which condition obtains when numbers are listed on the key-board and are accumulated on the adding wheels. The pitman 83 is held in its lower position (that shown in Fig. 7) by pin 94$^a$ against the tension of spring 93, one end of which is attached to pitman 83, the other end being attached to the side frame 2. The pin 94$^a$ of the total lever 94 bears against the surface 83$^a$ of the pitman 83, said pin acting to hold the pitman 83 in its lower position, in which position the recess 83$^b$ co-acts with the pin 95$^a$ on the arm 95 which as described is mounted on stud 81 and is rocked thereon as the pitman 83 moves back and forth when said pitman is in the position shown in Fig. 7. The total lever 94, loosely mounted on shaft 96, is provided at 94$^b$ with finger pieces. Should the lever 94 be swung in a forward direction, and held in such forward position, the pin 94ª will move rearward and will allow the pitman 83 to rise under tension of spring 93, and disengage the recess 83ᵇ from the pin 95ª. When this is done, it is arranged that the flat face 83ᶜ of pitman 83 shall contact with the pin 95ᵇ of the arm 95. The forward movement of pitman 83 will cause the surface 83ᶜ to slide along the pin 95ᵇ until in its forward position the surface 83ᶜ has passed by the pin 95ᵇ and the recess 83ᵈ engages the pin 95ᵇ (see Fig. 8) the pitman 83 being lifted by the tension of spring 93. In this position it will be seen that the forward movement of the pitman 83 has not moved the arm 95, and that the rearward movement of said pitman will move the arm 95 in a direction opposite to that which obtains when the pitman 83 engages the pin 95ª. This establishes the familiar relation of these parts whereby the adding wheels are left in mesh with the racks 75 during the forward movement of the mechanism, the adding wheels thus being reset to zero and then said adding wheels are lifted out of mesh during the return movement of the mechanism, leaving the number wheels in the zero position. Should the lever 94 be moved rearward and held in its rearward position, it is arranged that the pin 94ª shall move forward and allow the pitman 83 to rise under tension of spring 93, so that the recess 83ᵇ will be disengaged from the pin 95ª, but no further upward movement will be possible. In this position, the back and forth movement of the pitman 83 will not rock the arm 95 in either direction, and thus the number wheels will remain in mesh with the racks during the forward and backward movement of the mechanism, the number wheels being thus reset to zero and then rotated again to the position in which they stood at the beginning of this operation. This provides means for printing a total without clearing the number wheels.

Either the forward or backward movement of the total lever 94 will lift the link 97, one end of which is loosely connected to lever 94 by stud 98 and the other end of said link is loosely connected to bell crank 99 by stud 100. Bell crank 99 pivots on stud 101, mounted in side frame 2, and is held in a forward position by the tension of spring 102, one end of which is attached to the bell crank 99 and the other to the side frame 2 by spring stud 103. One end of link 104 is loosely connected to bell crank 99 by stud 105. The other end of link 104 is loosely connected to bell crank 106 by stud 107. Bell crank 106 pivots on stud 108 mounted on the bracket 18. A pin 109, carried by bell crank 106, contacts with the rearwardly extending arm of the comb 36. When the link 104 is moved rearward by the operation of the lever 94 and its connections, it rocks bell crank 106 and causes comb 36 to be depressed, and with it the fingers 36ª, thereby removing from the path of the stop bar 40 the stop portions 32ᵇ of the strip 32, as previously described. Loosely connected to comb 36 by stud 110 is link 111, its upper end having an elongated slot, (see dotted lines in Figs. 7 and 8) through which passes stud 112 mounted on comb 34. The depression of comb 36 will thus also cause comb 34 to be depressed against tension of spring 47, and with it the fingers 34ª which will cause the strips 33 to be swung aside, thereby releasing any number keys that may be depressed. These movements take place whenever the lever 94 is swung either backward or forward.

On link 104 is fixed a pin 113 which fits into fork 114ª of bell crank 114, said bell crank pivoting on stud 115 mounted in side frame 2. The rearward movement of link 104 will rock the bell crank 114, so that its arm 114ᵇ will be depressed sufficiently to allow the lever 116, pivoting on stud 118, to swing rearward under tension of spring 117, and thus latch the lip 116ª in the notch 114ᶜ of bell crank 114. This locks the lever 94, and the mechanism moved by it, in a fixed position. The pawl 119, commonly called the pass-by pawl, is loosely mounted on the lever 116 by the stud 120. Spring 121, one end of which is attached to the pawl 119 and the other to the lever 116, normally holds the pawl 119 against the stop pin 119ª (see Figs. 7 and 8) fastened to the lever 116. With the forward movement of the handle, 5, the pin 122 (see Fig. 2) mounted in the segmental plate 20 and projecting into the plane of pawl 119, will depress the pawl 119 against the tension of the spring 121, and said pin 122 will pass by the pawl without disturbing the position of the lever 116. On the return movement of the segment 201, the pin 122 will contact with the edge of pawl 119, and as the pawl is held in fixed position by the stop pin 119ª the lever 116 will be forced forward sufficiently to release the bell crank 114. This will allow the train of mechanism moved by the lever 94, as previously described, to return to normal position under tension of spring 102.

The correction lever 123 is mounted on stud 124 fixed in side plate 22 of the keyboard. It is held in its normal position (see Fig. 7) against the stop pin 125 by the tension of spring 126 one end of said spring being attached to the lever 123 and the other to the side plate 22. The rear end of the correction lever carries a pin 127 which is in the path of the overhanging arm 116ª of the lever 116. Depressing the correction lever by means of the key top 128 will bring the pin 127 into contact with the arm 116ª and will swing the lever 116 on its stud 118, so that the depending lever arm 116ᵇ will be moved forward. In this way the total lever 94, and the train of mechanism moved by it, may be released and allowed to return to normal position at the will of the operator if said lever 94 has been erroneously set in operating position.

The correction lever 123 has a depending portion 123ª which is arranged to contact with pin 129 mounted in the rearward projecting arm 34ᵇ of the comb piece 34. Depressing the lever 123 will, therefore, also depress the comb piece 34, causing the fingers 34ª to swing the strips 33 so that any depressed keys are released and allowed to return to normal. The elongated slot in the upper end of link 111 allows such depression of the comb 34 to take place without disturbing the comb piece 36.

As has been pointed out, the levers 80 and 95, (see Fig. 14) mounted loosely on stud 81 supported in side frame 2, work normally as a unit, said levers being locked together by the latch 130, loosely mounted on the stud 131 fixed in the lever 95. Latch 130 hooks over pin 132 fixed in lever 80. Spring 133, one end of which is attached to latch 130 and the other end to lever 95, holds latch 130 normally in the position shown in Fig. 14. Pin 134 fixed in lever 95 abuts against the edge of lever 80 completing the lock. On rod 65 is loosely mounted lever 135 to which is loosely connected link 136 by stud 137. Link 136 is connected at its other end by stud 139 to latch 138 which pivots on stud 115, (see Figs. 7 and 8). Link 136 has an arm 136ª, (see Figs. 14 and 15) said arm reaching rearward and on which are fixed pins 140 and 141, the pin 140 projecting into the path of latch 130. The rocking movement of the levers 80 and 95 on the stud 81, carrying with them the latch 130, would normally not interfere with the pin 140 on the link 136, due to the recess in latch 130 at 130ª. If, however, the lever 135 be moved rearward, the link 136 will be lifted and with it the pin 140. The latch 138 will also be lifted and the cam surface 138ª will force the lever 116 forward against the tension of spring 117 until the cam surface 138ª has passed by the projecting lip 116ᶜ of the lever 116, at which time the lever 116 will return to its normal position, wherein the lip 116ᶜ projects under the lever 138, holding same in its upward position, thus leaving the pin 140 in the path of the projecting arm 130ᵇ of the latch 130, (see Fig. 14). The rocking of the lever 95 by the action of the pitman 83, will carry the arm 130ᵇ against the pin 140 which will lift the latch 130, against tension of spring 133, away from the pin 132. The return movement of the lever 95 by the action of pitman 83 will thus fail to return the lever 80 as usual, for the reason that the latch 130 is unlocked from the pin 132, and there is thus introduced into the machine a variation in the timing of the movement of the adding wheels in relation to their meshing with the racks, whereby the adding wheels are out of mesh with the racks 75 during both the forward and rearward movement of the mechanism, as a result of which operation a number registered on the key-board will not be accumulated. To restore the arm 80 to its normal position and to relock the levers 80 and 95 together, there is provided the arm 142, pinned to shaft 200, said arm contacting with pin 143 fixed in lever 80, (see Figs. 7, 8 and 14). This contact takes place as the mechanism is completing its return stroke, the arm 142 by contact with the pin 143 forcing the upper end of the lever 80 forward and the pin 132 riding under the hook of the latch 130, the parts finally assuming the normal position shown in Fig. 14. It will be noted that the pin 122 has meanwhile operated by contact with pawl 119 to force the arm 116 forward, releasing the latch 138 and allowing the lever 135 and its connections to restore to normal position under tension of spring 136ᶜ, one end of which is fastened to the link 136 and the other end to the frame 2, (see Fig. 7).

The U-shaped bar 145, (see Fig. 1) swings loosely on the studs 146 (see Fig. 4) which are mounted in the side frames 2 and 3. It has an overhanging portion near its center at 145ª, said overhanging portion being of sufficient width to cover the paths of the type hammers 180 of the printing mechanism an exception being the hammer 180ª at the extreme right operating the designating signs type. The spring 147, one end attached to 145 and the other to the side frame 3, acts to hold the bar 145 in an upward position. It is arranged that the pin 94ᶜ on the total lever 94 (see Fig. 7) shall contact with the edge of U-shaped bar 145 so that when the total lever 94 is moved forward, the pin 94ᶜ will depress the bar 145 and thus the overhanging portion 145ª will be moved into the path of the hammers 180, precluding their normal operation and thus preventing the printing of amounts standing on the number wheels at the time. This provision allows the adding wheels to be reset to zero by the operation of the lever 94 without printing the amount appearing on said number wheels at the time.

At the left hand side of the machine, loosely mounted on shaft 96, is the non-print lever 148 carrying a pin 149 arranged to contact with the cam surface on edge of bar 145, (see Fig. 4). Moving the lever 148 rearward will depress bar 145, causing the overhanging portion 145ª to move into the path of the hammers 180 of the printing mechanism, in which position the hammers will be restrained from operating, said devices thus making provision whereby an item may, at the will of the operator, be added but not printed.

Diverging levers 74 are held in their rearward position by the L shaped cross bar 150, the respective ends of which are fixed in swinging arms 151, said arms being pinned to a shaft 152, (see Fig. 4). Arms 151 have projecting portions 151ª which support a rod 153, on which is loosely mounted a cam roll 154. A cam 155 is loosely mounted on the shaft 200, and the face 155ª of said cam normally bears against the cam roll 154, thus holding the arms 151 and the cross bar 150 in a rearward position, (see Fig. 4). The forward movement of the operating mechanism of the machine causes the cam 155, through the connecting link 195 to move from the position shown in Fig. 4 to that shown in Fig. 5, which movement allows the cam roll 154 to follow the surface of cam 155 from the face 155ª to 155ᵇ thus allowing the arms 74ª of the levers 74 to swing forward under tension of the springs 42, said tension being exerted by reason of the attachment of spring 42 to stop bars 40, which in turn are connected to lever 74 by studs 41 (see Fig. 5). Stop bars 40 will move forward until they meet a stop which normally, (when no keys are depressed), is the stop portion 32ᵇ of the strip 32. This distance so moved is sufficient to lift the arms 74ᵇ of the diverging levers 74 so that the type bar 163 will be raised, carrying with it to printing position the zero type, it being understood that the arms 74ª of the diverging levers 74 lie substantially in the plane of their associated number wheel units, while the rearward extending arms 74ᵇ are offset to a degree sufficient to bring them substantially into the plane of their associated type bars, (see Fig. 1). Loosely connected to the rear end of arm 74ᵇ of lever 74 by stud 160 is link 161 (see Fig. 5) which in turn is loosely connected by stud 162 to type bar 163. On the upper end of type bar 163 (see Fig. 13ᴬ) is a type cap 164, held in place by screws 164ª, preferably four in number, said cap being slotted to receive type pieces 165, ten in number and marked from 0 to 9. These type pieces are normally pressed forward by springs 165ª, held between the type bar 163 and the type cap 164. It is arranged so that when the stop bar 40 moves forward, its associated type bar will be raised a proportional distance, and when the stop bar comes to rest against the key stop, a type corresponding to the value of the key depressed will be brought into printing position.

The upward movement of each type bar 163 carries with it the pin 166 projecting from it, said pin normally holding the rear end of lever 167 in a depressed position against the tension of spring 168, (see Figs. 4 and 5) one end of which is fastened to lever 167 and the other to a fixed separator plate 169. The levers 167 are loosely mounted in a slotted shaft 170, (see Fig. 5) said shaft being fixed to and supported by depending arms 170ª (see Fig. 12ᴬ) loosely mounted on rock shaft 172 having bearings in side plates 173 and 174, (see Figs. 12 and 13). The rod 175 is mounted in arms 170ª, said rod extending from one arm to the other, and said rod occupying a position tangent to the concentric edges of levers 167, (see Fig. 5) whereby the rod acts as a retainer to hold said levers 167 in place in the annular grooves of shaft 170 and at the same time the levers are free to move on said shaft. One end of spring 170ᵇ is fastened to arm 170ª, the other end of said spring being attached to separator plate 169. A stop pin 169ª, (see Fig. 12ᴬ) is provided to limit the rearward movement of arm 170ª, said stop pin being fixed to separator plate 169. The arm 171 on shaft 172 has a depending portion 171ª which is in the path of the projecting stud 170ᶜ of the depending arm 170ª. Pinned to the shaft 172 is also the depending arm 185, to which is loosely connected one end of the link 186, the other end of said link being loosely connected to the arm 187 pinned to shaft 204.

The printing section side plates 173 and 174 are clamped together by the screws 188 threaded into the nuts 189, said nuts being held in the T slot in the separator plate 190 which has projecting ears 190ª fitting in side plates 173 and 174, (see Figs. 12 and 13). The screws 194 are threaded into the end of shaft 177 clamping the side frames 173 and 174 at that point. This structure forms a sub frame for the printing section. The forward ends of printing section side plates 173 and 174 are supported by the shaft 96 (see Fig. 12) and are clamped thereto by the latch 191 loosely attached to each side plate 173 and 174 by the stud 192. The lower ends of the side plate fork over the rolls 193 loosely mounted on shaft 204 said rolls 193 being grooved to receive said side plate ends as shown in Fig. 13.

On operating the machine, the shaft 172 is rocked by the described connections with the shaft 204. Near the end of the forward movement of the shaft 172, the depending portions 171ª of the arms 171 contact with the projecting studs 170ᶜ mounted in the depending arms 170ª, and the continued forward movement of the shaft 172 will cause the shaft 170 to swing forward against the tension of spring 170ᵇ. If a type bar 163 has risen above the zero printing position, due to a key being depressed, the forward end of lever 167 falls and engages the notch 176ª of the latch 176, (see Fig. 5) said latch being mounted on the grooved shaft 177 which is supported at each end in side plates 173 and 174, respectively. The latch 176 has a hook portion 176^b which is normally held forward by the spring 178, one end of said spring being attached to latch 176 and the other to the rod 179 supported at each end in the side plates 173 and 174. The hook portion 176^b of the latch 176 engages the hook portion 180^b of the hammer 180, mounted loosely in grooved shaft 172, said hammer being normally held by latch 176 in the position shown in Fig. 4 against the tension of the spring 181 one end of said spring being fastened to the hammer 180 and the other to the rod 182, supported at each end in the side plates 173 and 174, whereby the hammer 180 is locked in a normally retracted position. The arms 171 swinging rearward will at the same time carry rearward the rod 183 mounted in their upper ends as shown in Fig. 5. As the rod 183 approaches its rearward position, the latches 176 will have been moved sufficiently to free the hammer 180 which will strike rearward under tension of spring 181, striking the type which has been raised to printing position and causing same to record its value on the tape. On the return movement of the mechanism, the arms 171 will allow the levers 167 to move rearward under tension of spring 170^b thus allowing the latches 176 to return to normal by action of springs 178. The rod 183 will pick up such hammers as have been released and return them to their normal position, in which position they will be detained by the latches 176.

To provide for the automatic printing of zeros to the right of a figure of value, I employ the familiar method of having a finger portion 176^c of the latch 176 overlap the adjacent latch 176 of higher order. This insures all the latches 176 of lower order being released from their respective hammers, and since the type bars 163 have all risen to the zero printing point, all the hammers to the right of the figure of value when released will strike forward and print the zeros automatically.

The shaft 200, having bearings in the side frames 2 and 3, has rigidly fixed to it the master plate 201, one portion of which is a segment. A fixed stud 202 projects from plate 201, said plate 201 having a hub portion 201^e and slotted at 201^f. A stud 203 is fixed to the arm 90, mounted on the shaft 204. Loosely mounted on studs 203 and 202 is the long link 205, one end of which is supported by stud 203, the other end being forked and straddling stud 202. Forked plates 206, positioned in a vertical plane, are mounted loosely on studs 202 and 203 respectively and are linked together by the springs 207 one above the other for economy of space, the tension serving to hold the stud 202 in contact with the edge or wall at the bottom of fork in link 205. By these means an elastic connection is established between the shafts 200 and 204. Loosely mounted on the stud 208, fixed in the plate 201, is the link 209 one end of which is loosely connected by the stud 211 to the link 212. The spring 210, shown dotted in Figs. 2 and 3, has one end fixed to the plate 201, the other to the link 209. Link 212 has its rear end supported by stud 213 fixed in side frame 2. Thus the links 209 and 212 form a toggle joint, which is straightened as the plate 201 is swung forward or in a counter clockwise direction. When the plate 201 has reached the limit of its forward movement, the three centers of the studs supporting and connecting the links 209 and 212 would normally be in a straight line, but due to a slightly loose fitting of stud 211 in the holes in links 209 and 212, the tension of the spring 210 will lift the links upward slightly beyond the center, this upward motion being limited by the contact of the arm 212 with the pin 214 fixed in the side frame. With the parts in this position, the handle 5 is locked and cannot return to normal until links 209 and 212 have been depressed sufficiently to allow them to collapse. This is normally accomplished by the pin 215, fixed in the link 205, which pin has a forward and downward movement and which at the end of its movement will contact with the edge of the link 212, forcing same downward and breaking the lock. By this means, if the forward rocking of the shaft 200 is more rapid than the forward rocking of the shaft 204, as determined by the dash-pot control to be described later, the springs 207 of the elastic connection will be stretched and the stud 202 will move forward in the slot of link 205. When the shaft 200 has been rocked to its maximum forward position, the toggle joint will lock the plate 201 until the shaft 204 has reached its maximum forward position, at which time the pin 215 on the link 205 will contact with the link 212, forcing same downward, thus breaking the toggle lock, when the shaft 200 may be returned to normal.

The wipe pawl 216 is loosely mounted on the stud 217 fixed in the side frame 2. One end of spring 218 is fastened to pawl 216, its other end being fastened to the side frame 2, its tension normally holding the pawl 216 in the position shown in Fig. 2. On the forward movement of the plate 201, the pawl 216 will engage the usual notches in the concentric edge of plate 201, preventing its return until the pawl has passed by the projection 201^a of said master plate and sprung into the recess 201^b of said plate 201, (see Fig. 3). In this position the plate 201 may be returned to normal if the toggle lock has been broken by the pin 215 as previously described. At the left of the machine, pinned to the shaft 204, is the arm 220, shown dotted in Fig. 4, its outer end having a stud 221 which loosely connects a link 222 to it. A lever 223 is loosely supported at one end on shaft 200, and at the other end by link 222 to which it is loosely connected by stud 224. To a projecting portion 223$^a$ of the lever 223 is connected an oil dash-pot 226, of familiar construction, by the stud 225. The plunger rod 226$^a$ of the dash-pot is connected to the side frame 3 by the stud 227, (see Fig. 1). It will thus be seen that the rocking of the shaft 204 will rock the arm 220, which in turn through the connections of link 222 will move the lever 223 up and down, which movement will cause the dash-pot to be moved up and down, said dash-pot by its adjustment thus regulating the speed of movement of shaft 204 and all parts of the machine the movement of which is controlled by said shaft.

Figure 2:
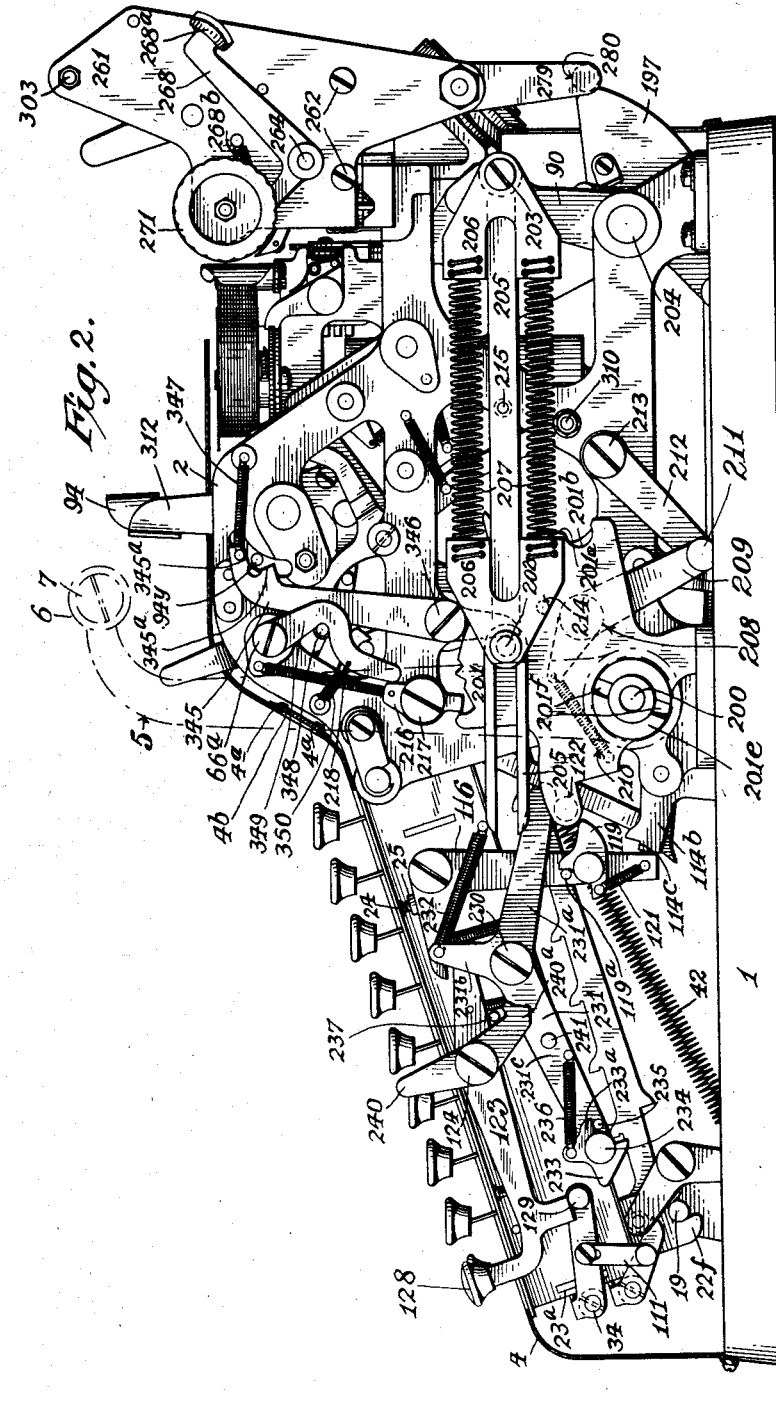
Fig. 2 illustrates a right side elevation with parts in normal position, the operating handle being shown dotted.

Mounted on the stud 230, fixed in the keyboard side plate 22, is the three-armed lever 231, constituting the main member for the automatic key release, its arm 231$^a$ held normally in the position shown in Fig. 2 against the pin 122 on the master plate by the tension of the spring 232, one end of which is fastened to the arm 231$^b$ of the lever 231, the other end being fastened to the keyboard side plate 22. At the forward end of arm 231$^c$ is the passby pawl 233, loosely mounted thereon by stud 234. Pawl 233 has its projection 233$^a$, normally held in contact with the pin 235, by the tension of the spring 236, one end of which is fastened to pawl 233 and the other to the lever 231. The forward movement of the master plate 201 will carry with it the pin 122, which will allow the spring 232 to lift the forward end of the lever 231 until it contacts with stop pin 237 fixed in key-board side plate 22 and cause the pawl 233 to pass by the stud 129 fixed in the comb 34. On the return movement of plate 201, pin 122 will contact with the arm 231$^a$ of the lever 231, forcing same upward and thereby forcing the arm 231$^c$ and with it the pawl 233 downward which in turn will depress the comb 34 through contact with the stud 129, such depression of comb 34 releasing any keys that may have been depressed, as has been previously explained.

The repeat lever 240, loosely mounted on the stud 124, is normally in the position shown in Fig. 2. If this lever be swung so that its depending end 240$^a$ is moved forward, it will come into the path of pin 241 fixed in lever 231. By this means the movement of the lever 231, under the tension of the spring 232, will be prevented, and keys depressed may thus at the will of the operator be held depressed during successive operations of the machine.

It has already been pointed out that the cam 155 is loosely mounted on the shaft 200. To its depending arm 155$^c$, is loosely connected a link 195 by stud 196. The other end of link 195 is loosely connected by stud 198 to depending arm 197$^a$ of cam 197 pinned to shaft 204. It will thus be seen that the rocking movement of cam 155 during its forward movement will be controlled by the rocking movement of shaft 204 which in turn is governed by dash-pot 226, whereby all the mechanism depending for operation upon cam 155 is brought under the control of the dash-pot.

Pinned to the shaft 200 is the lever 245, (see Fig. 4$^a$) one end having a projecting lip 245$^b$ which overlaps and contacts with the forward edge of cam 155, the other end of said lever being connected to main spring 246, said spring having its other end connected to spring stud 247 fastened to base 1. It is arranged that rocking the shaft 200 will rock lever 245 and stretch main spring 246, storing energy sufficient to operate the machine on its return stroke. This forward movement of lever 245 with shaft 200 is an idle movement as respects cam 155, allowing the cam to be controlled by the dash-pot, but during the return stroke of lever 245, its lip 245$^b$ contacts with the edge of cam 155, forcing said cam to its rearward or normal position.

Mounted on the side frames 2 and 3 at the rear of the machine, is the carriage supporting casting 250, having a depending portion 250$^a$, which supports a stud 251 on which is loosely mounted a roll 252 and also supports a second stud 253 on which is loosely mounted a grooved roll 254, said rolls 252 and 254 forming roller bearing for shaft 277 with which they contact. The upper face of casting 250 is grooved, forming a lower track for balls 255, two in number, which are held a uniform distance apart by the ball separator 256. Above casting 250 is casting 260 with rearwardly projecting arms 260$^a$ at each end. The lower face of casting 260 is grooved forming an upper track for balls 255. Fastened to each end of casting 260 are side plates 261, two in number, held in position by studs 262 two for each side plate, thus forming the carriage. Loosely mounted in side plates 261, is the platen shaft 269, supporting the platen 270. Pinned to the shaft 264, which is loosely supported in the side plate 261, is the arm 265, said arm acting as a carriage lock, said arm engaging the usual recesses in the spacing bar 266 fastened to the casting 250. Pinned to one end of the shaft 264 is the arm 268, having a finger piece 268$^a$ which is normally held in a rearward position by the spring 268$^b$, one end of said spring being attached to the arm 268 and the other to the carriage side plate 261. Rocking the arm 268 forward lifts the detent 265 out of a recess in the spacing bar 266, in which position the casting 260 can be moved laterally in relation to the casting 250, carrying with it the side plates 261 and all the parts mounted thereon, this movement providing a columnar spacing for the paper. Fixed at each end of platen shaft 269 is a twirler 271. Pinned to the shaft 269 is ratchet 272, the teeth of which are engaged by the detent roll 273 mounted on the detent lever 274, said lever pivoting on the stud 275, mounted in the side plate 261. The detent lever 274 is held normally in the position shown in Fig. 7 by the spring 276, one end of said spring being attached to the lever 274 and the other to the side plate 261. Supported rigidly at each end in side plates 261 is the shaft 277 which has loosely mounted at one end the feed lever 278 and to the other end the depending arm 279. Supported between 278 and 279 is the rod 280 which is normally held in contact with the face of the cam 197 on shaft 204 by the tension of spring 281. The forward movement of the cam 197 allows the rod 280 to swing forward, and lever 278 will rock rearward, carrying with it the pawl 282, loosely mounted in its upper end by the stud 283. Said pawl 282 is held upward in contact with stop pin 284, fixed in lever 278, by tension of spring 281, one end of said spring being attached to the pawl 282, the other end being attached to the side plate 261. This rearward movement of the pawl will allow it to engage a tooth of the ratchet 272, and with the return of the mechanism the pawl 282 will be forced forward by the action of the cam 197 against the rod 280, and in this manner the ratchet 272 will be partially rotated forward and with it the platen 270, thus establishing the familiar automatic line spacing for the paper.

The arm 278$^a$ of the lever 278 has at its upper end stop faces 278$^b$, 278$^c$ and 278$^d$. A projecting lip 286$^a$ of the lever 286 is arranged to be moved into the path of the stop portions 278$^b$, 278$^c$ and 278$^d$, and contacting therewith, will limit the rearward movement of arm 278$^a$ and with it the rearward movement of the pawl 282. Thus the stop 278$^b$ contacting with lip 286$^a$, will allow no backward movement of the pawl 282, thus preventing the rotation of the platen. The stop 278$^c$ will allow the pawl 282 to move backward a distance such that on its forward movement it will rotate the ratchet 272 one tooth. The stop 278$^d$ will allow the pawl 282 to move backward a distance sufficient to rotate the ratchet 272 two teeth on its forward movement. Thus, there is provided means for line spacing the paper, no space, single space or double space, at the will of the operator. The lever 286 pivots on the stud 287, mounted in the side plate 261. By swinging the lever 286 forward or backward, the lip 286$^a$ is moved upward or downward, its position determining the degree of movement of the lever 278. Lever 286 is held in a set position by the notches 288$^a$ of the segmental angle plate 288, which is fixed to side plate 261 by screws 289, the construction of the lever 286 being such that its long arm 286$^b$ may be sprung slightly outward away from the angle plate 288 when it is desired to shift it to a new position.

Mounted loosely in the side plates 261 is the shaft 290 which supports the pressure roll frames, each consisting of two swinging arms 291 fastened together at the respective ends by rods, 292 and 293. Mounted on the rod 293 are two arms 294 which support at one end the pressure roll 295, and at the other end pressure roll 296, loosely mounted therein. The spring 297, one end attached to rod 292 and the other to spring rod 298, supported in side plates 261, serves to hold the pressure rolls 295 and 296 in contact with the platen 270. At each end of shaft 290, and pinned thereto, are the rock arms 299, two in number, which are connected together by the tie rods 300 and 301. Tie rod 301 is normally in contact with the rear edges of arms 291. If pressure is exerted in a forward direction on rod 300, it will cause the rock arms 299 to move forward, carrying the rod 391 with them. This will move the arms 291 forward, against the tension of the springs 297, and will thus move the pressure rolls 295 and 296 away from the platen 270, thus providing the familiar paper release. The tie rod 302 threaded at each end is mounted in the side plate 261, said side plates being clamped together by nuts 303.

I have shown and described a particular form of carriage, simple in construction and light weight, and have also described a simple line spacing means, but it is apparent that any suitable form of carriage and line spacing means may be substituted for those herein illustrated.

Loosely mounted on the stud 306 in side frame 2 is the irregularly-shaped three-armed lever 307, (see Fig. 15). Its depending arm 307$^a$ is forked over the pin 308 attached to the bell crank 309, said bell crank pivoting on the stud 310 fixed in side frame 2. The rearward extending arm of bell crank 309, which is offset into the plane of the type bar 163$^A$, is forked over the pin 162$^A$ fixed in the type bar 163$^A$, said type bar carrying at its upper end type 165$^A$ for printing certain special designating signs. If the non-add lever 135 be swung rearward, throwing into operation the non-add mechanism, the link 136 will be raised as has been previously described, and the rearwardly extending arm 136$^a$ will also be raised, lifting with it the pin 141, said pin contacting with the edge of the arm 307$^b$ of the lever 307, (see Fig.

15) causing said arm to move rearward against the tension of spring 311, one end of said spring being fastened to lever 307 the other end to side frame 2. Through the connections described, the type bar 163^A will thus be lifted a distance that will bring into printing position the particular type designating the non-added amount, which is one of the designating signs. The forward end of lever 167 will then fall, and with the operation of the machine will trip the latch 176, causing the sign to be printed as has already been described.

In connection with the means for controlling the type bar 163^A having the designating sign, I employ a lever 312 adapted to position, through certain devices, the said type bar 163^A for printing the total designating sign. Again, if the lever 312, loosely mounted on shaft 96, be moved rearward, the pin 312^a will force rearward the arm 307^c of the lever 307, and through the connections described will bring to printing position a different type from that brought by the operation of lever 135. The latch 313 pivots on stud 314, mounted in side frame 2, and operates against tension of spring 315, one end of said spring being fixed to latch 314 and the other to side frame 2. Said latch 313 will fall into the notch 312^b in the lever 312, holding said lever in its rearward position. This is possible, however, only when the total lever 94 has also been moved rearward, as the lip 313^a of the latch 313 projects into the plane of lever 94 and will not move forward until the recess 94^z (see Fig. 14) of the lever 94 has been moved into a position to allow it to do so. Releasing the total lever 94, by the means already described, will cause the recess 94^z to cam the latch 313 rearward, and will thus simultaneously release the lever 312, allowing levers 312 and 307 to return to normal under tension of spring 311.

Again, when the lever 94 is moved forward, the pin 94^x will contact with the edge of the arm 307^c causing, through the connections already described, a third type to be raised to printing position for the purpose of printing a sign which designates the operation of returning the adding wheels to zero. In this manner the various designating signs are operated.

Mounted on bent over portions 173^a and 174^a of side plates 173 and 174, are the ribbon spools 320 which turn with the studs 321 as an axis, (see Figs. 12 and 13). Connected to each ribbon spool is the ratchet 322, which is engaged by the pawl 323, loosely mounted on the sliding strip 324, mounted in the side plates 173 and 174. Pawl 323 pivots on stud 325 in strip 324, the ends of said strip being bent at right angles to its main portion. A spring 326 is fixed around the studs 327 and 328, its upper end forcing the pawl 323 forward and into a position to engage the ratchet 322. In front of strip 324 is the sliding strip 329, on which is loosely mounted the bell crank 330, to which is attached spring 331. Projecting through the slot 329^a of the strip 329 is the stud 330^a fixed in the bell crank 330. This stud 330^a contacts with the cam surface 330^b (shown dotted in Fig. 13) of the strip 324, and positions the pawls 323 so that only one can engage its associated ratchet at any one time, as will presently be more fully explained. On the ribbon spools is mounted the ribbon 332 which passes in front of the type 165 and 165^A. Connected to the cam 197 by the screw stud 333 is the link 334, the upper end of which is loosely connected to the bell crank 335 by stud 336. Bell crank 335 pivots on stud 337, fixed in a bent over portion of side frame 173. The upward projecting arm of bell crank 335 is forked over stud 338 fixed in strip 329. By these connections, the rocking of the cam 197 will also rock the bell crank 335, causing the strip 329 to move back and forth, carrying with it the strip 324 and the pawls 323, through the connection of the pin 330^a in the bell crank 330. Since only one pawl 323 engages its associated ratchet 322, the ribbon will be fed in one direction continuously until it can be moved no farther. At that time, the pawl engaging the ratchet 322 will resist the push of the strip 329 under the action of cam 197, so that the pin 330^a will be forced downward against the tension of the spring 331, and the pin 330^a will engage the other recess of the cam surface, 330^b. In this way the idle pawl will be moved into operating position, and the direction of the ribbon feed will be reversed.

A shield 339 of thin sheet metal is provided between the ribbon 332 and the platen 270 to hold the paper away from the ribbon.

To prevent the printing of a total immediately after the accumulating mechanism has made a transfer until a spacing stroke has been taken, there is provided a U-shaped strip 340 mounted on screw studs 341 fixed in side frames 2 and 3, (see Figs. 1, 7 and 8). At the right is a depending portion 340^a, (see Figs. 7 and 8) of hook shape, designed to engage the pin 94^w of the total lever 94. The strip 340 is held normally in a rearward position against the tension of spring 342, one end of which is fast to strip 340 the other being fastened to bar 145. When the operation of "carrying" takes place, the latch 72 moves from the position shown in Fig. 9 to that shown in Fig. 10, forcing the strip 340 forward, and causing the hook portion of depending arm 340^a to engage the stud 94^w of the lever 94, in which position the lever 94 is locked against movement in either direction. A spacing stroke will restore the latch 72 to its normal position, as heretofore described, thus allowing the strip 340 to return to normal, in which position the stud 94$^W$ is released from the hook portion of arm 340$^a$.

If the total lever 94 be moved only partially forward or backward, the stud 94$^x$, attached to said total lever and projecting through the side frame 2, will contact with the cam surfaces 345$^a$ of the lever 345, (see Figs. 2 and 3) forcing said lever slightly forward. Lever 345 pivots on stud 346, mounted in side frame 2, the tension of spring 347 tending to move it rearward. A projecting portion of lever 345 carries a stud 348, which engages the edge of lever 349, pivoting on sleeve nut 66$^a$ on shaft 65. Spring 350 tends to move lever 349 forward. When lever 345 is forced forward by the partial movement of lever 94, the stud 348 will be moved forward, and will allow lever 349 to move forward also under tension of spring 350. The lower end of lever 349 will contact with the wipe pawl 216, tilting said wipe pawl 216 so that its lower end will move into the path of the notched portion of the master plate 201, preventing the forward movement of said plate. The continued forward or backward movement of lever 94 will cause the pin 94$^x$ to move to a position such that the lever 345 will assume its normal position, the lever 349 will then be drawn rearward by the tension of the spring 347 which is sufficient to overcome the tension of spring 350. The wipe pawl 216 will then assume its normal position, and the plate 201 may be moved forward. By this means the operating lever of the machine is locked against operation until the total lever is in proper operating position.

The upper end of lever 345 is held forward against the tension of spring 347 (see Fig. 2) when the plate 201 is in its normal position by contact of its lower end with a projecting portion (stud 202) of said plate. A forward movement of plate 201 allows the upper end of lever 345 to move rearward (see Fig. 3) its forked portion straddling the stud 94$^x$ in which position the lever 94 is locked against movement in either direction. By this means the operation of the total lever 94 is prevented except when the operating lever is in its normal position.

The general operation of the machine is first to depress the keys representing the amount to be added. The operating lever is then moved forward and back, the amount registered on the key-board being printed and accumulated by the operation of the mechanisms already described. This is repeated for as many items as are to be included in the total desired. If a single key in any column has been wrongly depressed, the error may be corrected by depressing the proper key in that column which will restore the key first depressed by the operation of the mechanism already described. If the entire amount is incorrect, the manually operated key release lever 123 may be operated, thus restoring all the depressed number keys. This lever being located at the lower right hand corner of the key-board is in a position most convenient for operation by the operator.

Should it be desired to hold the keys depressed during successive operations of the machine, the upper end of repeat lever 240, located on the right hand side of the machine, is swung rearward as the hand is moving toward the main operating lever, the thumb of the right hand preferably being used. As the last of the successive operations is being performed, the forefinger of the right hand is brought in contact with the repeat lever 240 as the main operating lever is completing its forward stroke, thus restoring the repeat lever 240 to its normal position. The depressed keys will then be released during the rearward movement of the main operating lever by means of the automatic key release mechanism, already described. The location of the repeat lever 240 at the right of the machine, and the back and forth movement of said repeat lever, afford a most convenient manner of operation by the operator.

When it is desired to record an amount depressed on the key-board but not to accumulate same, it is arranged, through the mechanism already described, that swinging the upper end of the non-add lever 135 rearward, preferably by the use of the thumb of the right hand as the hand is moving toward the main operating lever, will cause the amount depressed on the key-board to be printed only, when the main operating lever is moved back and forth. A special designating sign will be printed alongside of this amount to show it has not been included as part of the total. The location of this lever also at the right hand side of the machine and its rearward swinging movement affords a most convenient means of operation by the operator.

After the items have been listed and it is desired to print a total, the total lever 94 is moved rearward, and by the operation of the mechanism already described, when the main operating lever is moved back and forth, the sum of the items will be printed and the amount will be retained on the number wheels. Lever 94 is so situated as to be most conveniently swung rearward by the thumb of the right hand while the right hand rests in operating position on the main operating lever. When it is desired to restore the number wheels to zero, the total lever 94 is moved forward, its location being such that it is most conveniently operated by the forefinger of the right hand while the right hand rests in operating position on the main operating lever. By the operation of the mechanism already described, when the main operating lever is moved forward and backward, the wheels will then be reset to zero, the amount appearing on them being simultaneously prevented from printing.

It is, therefore, evident that by arranging the key release means, the repeat means, the non-add means, and the total and clearing means at the right hand side of the machine, and immediately adjacent to the path of the main operating lever, I have provided for the operator, in the manner above described, a most convenient and efficient means for controlling the various operations of the machine.

It will be further apparent that by locating these various controlling mechanisms immediately adjacent to the main operating lever and in close proximity to each other and by mounting them substantially upon the right side frames wholly, that I am able to greatly simplify the mechanism of the machine, since many of the parts combine several functions, as is particularly illustrated in the master plate 201, the arm 90 and the lever 94. The arrangement of the parts has also enabled me to reduce the required number of pieces, to simplify the mechanism, to diminish the weight and decrease the dimensions of the machine as a whole, to the end that without sacrificing substantial construction or omitting any of the necessary functions of a fully equipped commercial adding and listing machine, I am enabled to build a machine of smaller size, greater portability and at less cost than other machines similarly equipped and capable of performing the same work, with which I am familiar.

I claim:

1. In an adding machine, a series of depressible number keys, one end of each key acting when depressed as a stop, a stop bar carrying a series of stops, one for each number key, the stops for some of said number keys being located upon said stop bar at a distance to the rear of the depressed position of the number key with which it is adapted to coöperate greater than the distance between key stops, and means for moving the stop bar to avoid contact between stop bar stops and inappropriate key stops and for producing contact between a given stop bar stop and the key stop with which it is adapted to coöperate said number key stops being all in the same vertical plane.

2. In an adding machine, a series of depressible keys, one end of each key acting as a stop when said key is depressed, a series of stop bars each carrying a series of stops spaced at regular intervals upon said stop bars, there being one stop for each key and the stops for some keys being located to the rear of the depressed position of the key stops with which they coöperate a distance greater than the interval between adjoining key stops, and means for moving the stop bar to avoid contact between stop bar stops and inappropriate key stops and for producing contact between a given stop bar stop and the key stop with which it is adapted to coöperate, said stop bar stops and key stops being all in the same vertical plane.

3. A key-board having depressible number keys, one end of each key carrying a numbered finger piece and the other end of said key acting as a stop when the key is depressed, the stop ends of said keys being in the same vertical plane, a stop bar carrying a series of stops one for each number key, said stop bar stops all being in the same vertical plane and said stop bar stops for some keys being located upon the stop bar longitudinally from the depressed position of the key stops with which they coöperate a distance greater than the interval between key stops, and means for moving the stop bar to avoid contact between stop bar stops and inappropriate key stops, and for effecting contact between a given stop bar stop and its appropriate key stop.

4. In an adding machine, a series of depressible keys having stop portions movable into operative position when said keys are depressed, a stop bar carrying a separate stop for each key stop, and means whereby certain of the stop bar stops are given a forward and upward movement prior to engaging their proper key stops, said forward and upward movement allowing certain stop bar stops to pass under certain depressed key stops without interference.

5. In an adding machine, a series of depressible keys, having stop portions movable into operative position when said keys are depressed, a stop bar carrying a separate stop for each key stop, and means for moving said stop bar in such a manner that certain of the stop bar stops are on occasion caused to pass under certain depressed key stops without interference and are positioned to engage appropriate key stops.

6. In an adding machine, number wheels, a series of racks for actuating said number wheels, stop bars each carrying a series of stops by which the extent of travel of said racks may be governed, pivoted arms supporting said racks and one end of said stop bars, a support for the other end of said stop bars, a series of depressible number keys arranged above said stop bars, means for holding any one key depressed, one end of said keys when depressed, acting as stops for said stop bars, and means for moving the stop bars backward and forward whereby the extent of their travel, as permitted by the depressed number keys, is recorded by the racks on the number wheels moving said stop bar in such a manner that certain of the stop bar stops are on occasion caused to pass under certain of the depressed key stops and are positioned to engage appropriate key stops.

7. In an adding machine, number wheels, reciprocable racks for actuating said number wheels, a series of stop bars each carrying a series of stops by which the extent of movement of said racks is governed, pivoted arms supporting said racks and also supporting one end of said stop bars, a support for the other end of said stop bars, a series of depressible number keys arranged above said stop bars, means for holding each key depressed, one end of said keys when depressed acting as stops for said stop bars, and means for moving the stop bars backward and forward whereby the extent of their movement, as permitted by the depressed number keys, is recorded by the racks on the number wheels and for moving said stop bar in such a manner that certain of the stop bar stops are on occasion caused to pass under certain of the depressed key stops and are positioned to engage appropriate key stops.

8. In an adding machine, a stop bar carrying a series of stops, a series of depressible keys numbered from 1 to 9, said keys carrying stop members positioned for coöperation with certain of said stop bar stops, a type bar carrying type numbered from 0 to 9, a lever loosely connected to said type bar, said stop bar having a zero stop at one end and supported at the other end by said lever, the stops of said stop bar for co-acting with the numbered keys being located between its supported end and the zero stop and means for moving said stop bar in such a manner that certain of the stop bar stops are on occasion caused to pass under certain of the depressed key stops and are positioned to engage appropriate key stops.

9. In an adding machine, a key-board, provided with depressible keys, said key-board being positioned at an angle to the base line of the machine, and each of said keys having a stop portion adapted to be brought into operative position when the key is depressed, a series of stop bars carrying stops positioned for coöperation with said key stops, said stop bars being positioned normally at an angle with the base line different from the angle of the key-board and means for imparting reciprocating motion to the stop bars, the angle of inclination of the stop bars with respect to the base line of the machine increasing with the forward movement of said stop bars.

10. In an adding machine, a key-board provided with depressible keys, said key-board being positioned at an angle to the base line of the machine—each of said keys having a stop portion adapted to be brought into operative position when said key is depressed, a series of stop bars each carrying stops which coöperate with said key stops, said stop bars being positioned normally at an angle with the base line different from the angle of the inclination of the key-board, and means for imparting reciprocating motion to said stop bars so that the angle of said bars relatively to the base increases during the forward movement of said stop bar until said stop bar has reached a maximum forward position, whereupon the said stop bars assume an angular position with respect to the base line substantially equal to the angle of inclination of the key-board to said base line.

11. In an adding machine, adding wheels, racks for operating the same, stop bars with multiple stops, depressible keys having a stop portion engageable with said stop bar stops and levers for wholly supporting said racks, said stop bars being pivotally connected to said levers at a point between the fulcra of said levers and the supporting points of said racks and means for moving said stop bar in such a manner that certain of the stop bar stops are on occasion caused to pass under certain of the depressed key stops and are positioned to engage appropriate key stops.

12. A key-board having rows of depressible keys adapted to be detained in depressed position, rods positioned parallel to said rows of keys, a stop bar, a detent operating to retain the stop bar in a rearward position, a strip loosely mounted on one of said rods and co-acting with a row of keys for holding said keys depressed, a second strip having a portion acting as the stop bar detent, said second strip being mounted on the same rod and coöperating with an adjacent row of keys, and a spring acting to press said strips against their respective rows of keys.

13. In an adding machine, a shaft, an adding wheel carrier adapted for swinging movement with said shaft as its axis, a key-board carrying depressible keys and retaining means for said keys, means for supporting one end of said key-board on said shaft and latching means for the key-board, said key-board with the keys and key-retaining means being removable and replaceable as a unit with respect to said adding wheel carrier.

14. In an adding machine, adding wheels including a carrier therefor, a key-board carrying depressible keys and retaining means for said keys, means for supporting one end portion of the key-board adjacent the adding-wheel-carrier and latching means coöperating with the other end portion of the key-board, said key-board with the keys and key restoring means being removable and replaceable as a unit with respect to said adding wheel carrier.

15. In an adding machine, adding wheels, racks for operating the same, levers for wholly supporting said racks, depressible keys having a stop portion and integral L-shaped stop bars, each provided with a plurality of stops adapted to engage said keys, one leg of said stop bars being connected to said levers at a point above the body of said bars and the other leg of said stop bars being located in the same vertical plane as the keys and supported upon a support about which it is free to oscillate, whereby certain of said stop bar stops are given a movement prior to engaging their proper key stops, to permit them to pass under other key stops without interference.

16. In an adding machine, adding wheels, racks for operating the same, a plurality of depressible keys arranged in parallel rows and each provided with a stop portion, means for individually holding said keys in depressed position, levers for wholly supporting said racks, a plurality of integral L-shaped stop bars having an upstanding leg and a relatively horizontal portion, each located in the same vertical plane as a row of keys and each provided with a plurality of stops, the upstanding leg of said stop bars being pivotally connected to said levers at a point adjacent the end of said up-standing leg, and the horizontal portion of said stop bars being supported upon a support about which it is free to oscillate, whereby certain of said stop bar stops are given a movement prior to engaging their proper key stops, to permit them to pass under other key stops without interference.

17. In an adding machine, adding wheels, racks for operating same, levers for wholly supporting said racks, pivotally mounted adjacent their lower ends and carrying racks adjacent their upper ends, a plurality of depressible keys located in parallel rows and each provided with a stop portion, a plurality of integral angular stop bars each having a relatively vertical and a relatively horizontal leg and provided with a plurality of stops adapted to coöperate with the stop portions of the number keys, said stop bars being pivoted adjacent the upper end of their relatively vertical portions and said levers and having their relatively horizontal legs supported upon a support about which they are free to oscillate and upon which they are free to move longitudinally, whereby certain of said stop bar stops are given a movement prior to engaging their proper key stops to permit them to pass under other key stops without interference.

18. In an adding machine, a series of depressible keys numbered from 1 to 9, one end of a key acting when depressed as a stop, a stop bar carrying a series of stops, one for each key stop and all in the same vertical plane, and means for bringing a stop bar stop into contact with its proper key stop, certain higher value stop bar stops such as the 6, 7, or 8, being able on occasion to pass without interference beneath the 7, 8, or 9 key stop respectively, when one of said 7, 8 or 9 keys is depressed, thus allowing the 7, 8, or 9 stop bar stop to engage its proper depressed key stop.

19. In an adding machine, a series of depressible keys numbered from 1 to 9, one end of each key acting when depressed as a stop, a stop bar carrying a series of stops, one for each key stop, and means for giving the stop bar a longitudinal and downward and upward movement, to enable certain higher value stop bar stops to pass beneath certain higher value key stops when one of said key stops is depressed, to permit one of said higher value stop bar stops to engage its proper depressed key stop.

20. In an adding machine, a series of depressible keys numbered from 1 to 9, one end of each key acting when depressed as a stop, a stop bar carrying a series of stops, one for each key stop, and means for bringing a stop bar stop into contact with its proper key stop, said means included in the keys of certain higher value stop bar stops, such as 6, 7, or 8, means for moving the stop bar in a longitudinal downward and upward direction, to enable such higher value stop bar stops to pass without interference beneath the 7, 8, or 9 key stop respectively when one of said 7, 8, or 9 keys is depressed, thus allowing the 7, 8, or 9 stop bar stop to engage its proper depressed key stop.

21. In an adding machine, a pair of vertical side frames, a horizontal shaft connecting said side frames, a key-board carrying depressible keys and retaining means for said keys, a second transverse shaft, means for supporting the key-board on both of said shafts and latching means for the key-board, whereby said keyboard with the keys and key retaining means are held upon said shafts and are readily removable as a unit therefrom.

22. In an adding machine, depressible number keys which are retained in depressed position and means for releasing said keys, a total lever which may be set in different operative positions and means for releasing same, a non-add lever which may be set in its operative position and means for releasing same, in combination with a master plate, and operating means therefor, said plate carrying means for operating the key-release means, the total-lever release means, and the non-add lever release means.

23. In an adding machine, a pair of vertical side frames, a plurality of adding wheels supported in said side frames, a transverse shaft extending between said side frames adjacent to the adding wheels, a second transverse shaft extending between said side frames adjacent the forward end of the machine, a key-board carrying depressible keys and retaining means for said keys, means for supporting the rearward end of said key-board on said first transverse shaft, including means for preventing upward movement thereof, means for supporting the other end of said key-board on said second transverse shaft, permitting downward movement thereof and latching means adapted to hold the forward end of the key-board to the forward transverse shaft whereby said key-board with the keys and key-retaining means are held upon said transverse shafts and are readily removable and replaceable as a unit.

24. In an adding machine, depressible number keys which are retained in depressed positions and means for releasing said keys, a total lever which may be set in different operative positions and means for releasing same, a non-add lever which may be set in its operative position and means for releasing same, in combination with a master plate, a shaft on which said master plate is mounted, said plate carrying means for operating the key-release-means, the total lever release means, and the non-add lever release means, a second shaft adjacent the first shaft, a support on said master plate, an elastic connection between the first and second shafts, one end of said elastic connection being carried by the said support, and a slotted link one end of which is carried by said support, and a piece mounted on the second shaft for supporting the other ends of said elastic connection and of said slotted link.

25. In an adding machine, depressible number keys, means for individually retaining said keys in a depressed position, means for releasing said keys, a total lever which may be set in a plurality of operative positions and means for releasing the same, in combination with a master plate and operating means therefor, said plate carrying means for operating the key releasing means and the total lever releasing means.

26. In an adding machine, a total lever which may be set in a plurality of different operative positions, means for releasing the same, a non-add lever adapted to be set in operative and inoperative positions and means for releasing the same, in combination with a master plate and operating means therefor, said plate carrying means for operating the total lever releasing means and the non-add lever releasing means.

27. In an adding machine, a hand-operated main operating lever, a manually operated item repeating lever adapted to be swung into operative and inoperative positions, a manually operated non-adding lever adapted to be swung into operative and inoperative positions, and a manually operated lever controlling the printing of totals, adapted to be swung into operative and inoperative positions, the said item repeating lever, item non-adding lever and total lever being all located at one side of the machine adjacent the main operating lever, so as to be operable by a swinging motion with the fingers of the hand operating the main operating lever while said hand rests in operating position on said main operating lever.

28. In an adding machine, a hand-operated main operating lever, a manually operated item repeating lever adapted to be swung into operative and inoperative positions, a manually operated item non-adding lever adapted to be swung into operative and inoperative positions and located to the rearward of said item repeating lever and manually operated levers adapted to be swung into operative and inoperative positions controlling the printing of totals and the clearing of the machine, located to the rearward of said item non-adding lever, all of said levers being located at one side of the machine adjacent the main operating lever, so as to be operable with the fingers of the hand operating the main operating lever while the hand rests in operating position on said main operating lever.

29. In an adding machine, a hand-operated main operating lever, a manually operated item repeating lever adapted to be swung forwardly and rearwardly of the machine into inoperative and operative positions, and manually operated levers controlling the printing of totals and the clearing of the machine, adapted to be swung forwardly and rearwardly of the machine, all of said levers being located at one side of the machine adjacent the main operating lever to be operable with the fingers of the hand operating the main operating lever while said hand rests in operating position on said main operating lever.

30. In an adding machine, a hand-operated main operating lever, a manually operated item repeating lever adapted to be swung forwardly and rearwardly of the machine into inoperative and operative positions, a manually operated item non-adding lever located to the rearward of said item repeating lever and adapted to be swung forwardly and rearwardly of the machine into inoperative and operative positions, means for automatically releasing said item non-adding lever from its operative position and manually operated levers controlling the printing of totals and the clearing of the machine, located to the rearward of said item non-adding lever and adapted to be swung forwardly and rearwardly of the machine, all of said levers being arranged at one side of the machine adjacent to the main operating lever to be operable with the fingers of the hand operating the main operating lever while said hand rests in operating position on said main operating lever.

31. In an adding machine, depressible number keys which are retained in depressed position and means for releasing said keys, a total lever which may be set in different operative positions and means for releasing same, a non-add lever which may be set in its operative position and means for releasing same, in combination with a main operating shaft carrying means for operating the key release means, the total lever release means and the non-add lever release means.

32. In an adding machine, a pair of side frames, an accumulating section comprising a plurality of movable counters mounted upon said side frames, a printing section comprising a plurality of movable type carrying members, means for moving each of said type carrying members to accord with movements of its corresponding counter, a detachable joint interposed between said means and the type carrying members, a frame adapted to hold said type carrying members and to permit movement thereof with respect to one another in accordance with movement of their corresponding counters, a pair of transverse shafts adapted to support said frame and means for securing said frame to said transverse shafts.

33. In an adding machine, a plurality of type carrying members adapted to be moved with respect to one another, a frame adapted to hold said type carrying members, a pair of side frames, a stationary shaft extending between the side frames, a rotatable shaft also extending between the side frames, detachable means for fixedly securing the frame to the stationary shaft and means for supporting the frame upon the movable shaft while permitting movement thereof with respect to the frame.

34. In an adding machine, a plurality of type carrying members movable longitudinally with respect to one another, a frame adapted to hold said type carrying members in fixed positions laterally and transversely with respect to one another but to permit longitudinal movement thereof, a pair of side frames, a stationary shaft extending between the side frames, a rotatable shaft also extending between the side frames, detachable means for fixedly connecting said frame to said stationary shaft and means mounted upon said rotating shaft for supporting said frame thereon, while permitting movement of said movable shaft with respect to said frame.

35. In an adding machine, a printing section comprising a plurality of type carrying members and a frame adapted to hold said members, an accumulating section, detachable means for connecting movable parts of the accumulating section to the type carrying members, a pair of side frames, a stationary shaft extending between the side frames, means for securing said accumulating section frame to said stationary shaft, a rotating shaft and means mounted upon said rotating shaft and movable with respect thereto, for supporting said printing section frame.

36. In an adding machine, an accumulating section, a printing section comprising a plurality of movable type carrying members, a frame adapted to hold said type carrying members, detachable connections between said type carrying members and the accumulating section, an ink ribbon, means for advancing said ribbon, comprising a pair of ribbon spools mounted upon said frame and movable therewith, a pair of side frames, a stationary shaft extending between the side frames, detachable means for fixedly connecting the printing section frame to said stationary shaft, a rotating shaft and means for supporting said printing section frame upon said rotating shaft while permitting motion of the movable shaft with respect to said printing section frame.

37. In an adding machine, a key-board, provided with depressible keys, each of said keys having a stop portion adapted to be brought into operative position when the key is depressed, a series of stop bars carrying stops positioned for coöperation with said key stops, said stop bars being positioned normally at an angle with the key-board and means for imparting reciprocating motion to the stop bars, the angle of inclination of the stop bars with respect to the key-board varying with the forward movement of said stop bars.

38. In an adding machine, a key-board provided with depressible keys, each of said keys having a stop portion adapted to be brought into operative position when said key is depressed, a series of stop bars each carrying stops which coöperate with said key stops, said stop bars being positioned normally at an angle with the key-board, and means for imparting reciprocating motion to said stop bars so that the angle of said bars relatively to the key-board varies during the forward movement of said stop bar until said stop bar has reached a maximum forward position.

39. In an adding machine, a shaft, an adding wheel carrier adapted for swinging movement with said shaft as its axis, a key-board carrying depressible keys and retaining means for said keys, means for supporting one end of said key-board on said shaft and latching means for the key-board.

40. In an adding machine, a shaft, an adding wheel carrier adapted for swinging movement with said shaft as its axis, a key-board carrying depressible keys and retaining means for said keys, and means for supporting said key-board on said shaft, said key-board being removable and replaceable as a unit.

41. In an adding machine, a plurality of type carrying members adapted to be moved with respect to one another, a frame adapted to hold said type carrying members, a pair of side frames, a shaft extending between the side frames, a second shaft also extending between the side frames, detachable means for securing the frame to the first shaft and means for supporting the frame upon the second shaft while permitting movement thereof with respect to the frame.

HEBER C. PETERS.